US012073443B1

(12) United States Patent
Brandt et al.

(10) Patent No.: US 12,073,443 B1
(45) Date of Patent: *Aug. 27, 2024

(54) PROACTIVE LISTENING BOT-PLUS PERSON ADVICE CHAINING

(71) Applicant: Wells Fargo Bank, N.A., San Francisco, CA (US)

(72) Inventors: Balin K. Brandt, Brooklyn, NY (US); Laura Fisher, Rock Hill, SC (US); Marie Jeanette Floyd, Toronto (CA); Katherine J. McGee, San Francisco, CA (US); Teresa Lynn Rench, Mount Holly, NC (US); Sruthi Vangala, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/074,848

(22) Filed: Dec. 5, 2022

Related U.S. Application Data

(63) Continuation of application No. 17/195,092, filed on Mar. 8, 2021, now Pat. No. 11,521,245, which is a
(Continued)

(51) Int. Cl.
*G06Q 30/0279* (2023.01)
*G06Q 20/02* (2012.01)
(Continued)

(52) U.S. Cl.
CPC ......... *G06Q 30/0279* (2013.01); *G06Q 20/02* (2013.01); *G06Q 20/108* (2013.01);
(Continued)

(58) Field of Classification Search
CPC .. G06Q 30/0279; G06Q 20/02; G06Q 20/108; G06Q 20/16; G06Q 20/227;
(Continued)

(56) References Cited

U.S. PATENT DOCUMENTS

| 4,223,403 A | 9/1980 | Konheim et al. |
| 4,731,842 A | 3/1988 | Smith |

(Continued)

FOREIGN PATENT DOCUMENTS

| AU | 2015201432 A1 | 4/2015 |
| WO | WO-01/69830 A2 | 9/2001 |

(Continued)

OTHER PUBLICATIONS

"Internet Portals Explained." Jul. 10, 2013. http://istarthere.com/internet-portals-explained/. (Year: 2013).
(Continued)

*Primary Examiner* — Yogeshkumar Patel
(74) *Attorney, Agent, or Firm* — Foley & Lardner LLP

(57) ABSTRACT

A pervasive user experience capable of integrating robo-advising with human advising is discussed. Conversations and other inputs may be actively captured to identify issues with which the system may be able to assist. Inputs from multiple conversations separated in time may be correlated to identify relevant needs and goals. Recommendations and strategies may be developed and presented to the customer. When it is determined that human advising is appropriate for one or more issues, the customer may be connected to an advisor for assistance with particular issues. Transitions may be facilitated to allow customers to more efficiently return to robo-advising until human advising is again deemed appropriate.

20 Claims, 19 Drawing Sheets

Related U.S. Application Data continuation of application No. 16/381,207, filed on Apr. 11, 2019, now Pat. No. 10,951,762.

(60) Provisional application No. 62/666,591, filed on May 3, 2018, provisional application No. 62/666,587, filed on May 3, 2018, provisional application No. 62/656,753, filed on Apr. 12, 2018, provisional application No. 62/656,750, filed on Apr. 12, 2018.

(51) Int. Cl.

| | | |
|---|---|---|
| *G06Q 20/10* | (2012.01) | |
| *G06Q 20/16* | (2012.01) | |
| *G06Q 20/22* | (2012.01) | |
| *G06Q 20/32* | (2012.01) | |
| *G06Q 20/36* | (2012.01) | |
| *G06Q 20/40* | (2012.01) | |
| *G06Q 50/00* | (2024.01) | |
| *G10L 15/18* | (2013.01) | |
| *G10L 15/22* | (2006.01) | |
| *G10L 17/00* | (2013.01) | |
| *H04L 9/40* | (2022.01) | |
| *H04M 3/51* | (2006.01) | |

(52) U.S. Cl.
CPC ........... *G06Q 20/16* (2013.01); *G06Q 20/227* (2013.01); *G06Q 20/3224* (2013.01); *G06Q 20/3676* (2013.01); *G06Q 20/4014* (2013.01); *G06Q 50/01* (2013.01); *G10L 15/1807* (2013.01); *G10L 15/22* (2013.01); *G10L 17/00* (2013.01); *H04L 63/102* (2013.01); *H04L 63/104* (2013.01); *H04M 3/5183* (2013.01); *G10L 2015/228* (2013.01); *H04L 2209/56* (2013.01)

(58) Field of Classification Search
CPC ........... G06Q 20/3224; G06Q 20/3676; G06Q 20/4014; G06Q 50/01; G06Q 30/0201; G10L 15/1807; G10L 15/22; G10L 17/00; G10L 25/63; G10L 2015/228; H04L 63/102; H04L 63/104; H04L 2209/56; H04M 3/5183; H04M 3/5175
See application file for complete search history.

(56) References Cited

U.S. PATENT DOCUMENTS

| | | | |
|---|---|---|---|
| 4,933,971 A | 6/1990 | Bestock et al. | |
| 5,577,121 A | 11/1996 | Davis et al. | |
| 6,466,654 B1 | 10/2002 | Cooper et al. | |
| 7,096,494 B1 | 8/2006 | Chen | |
| 7,315,837 B2 | 1/2008 | Sloan et al. | |
| 7,343,335 B1 | 3/2008 | Olliphant | |
| 7,818,233 B1 | 10/2010 | Sloan et al. | |
| 8,660,849 B2 | 2/2014 | Gruber et al. | |
| 8,880,402 B2 | 11/2014 | Wasson et al. | |
| 8,998,096 B2 | 4/2015 | Brown | |
| 9,098,845 B2 | 8/2015 | Florek et al. | |
| 9,117,208 B2 | 8/2015 | Drury et al. | |
| 9,123,038 B2 | 9/2015 | Cozens et al. | |
| 9,213,855 B1 | 12/2015 | Corrales et al. | |
| 9,218,594 B2 | 12/2015 | Ramakrishna et al. | |
| 9,224,113 B2 | 12/2015 | Grigg et al. | |
| 9,318,108 B2 | 4/2016 | Gruber et al. | |
| 9,477,945 B2 | 10/2016 | Wu et al. | |
| 9,495,331 B2 | 11/2016 | Govrin et al. | |
| 9,519,932 B2 | 12/2016 | Calman et al. | |
| 9,548,050 B2 | 1/2017 | Gruber et al. | |
| 9,973,689 B2 | 5/2018 | De Bayser et al. | |
| 10,027,797 B1 | 7/2018 | Hodge et al. | |
| 10,162,896 B1 | 12/2018 | Sumter et al. | |
| 10,276,170 B2 | 4/2019 | Gruber et al. | |
| 10,291,560 B2 | 5/2019 | Bern et al. | |
| 10,332,047 B2 | 6/2019 | Wu et al. | |
| 10,510,107 B1 | 12/2019 | Lee et al. | |
| 10,573,146 B1 | 2/2020 | Jordan et al. | |
| 10,916,251 B1 | 2/2021 | Brandt et al. | |
| 10,943,308 B1 | 3/2021 | Brandt et al. | |
| 10,951,762 B1 | 3/2021 | Brandt et al. | |
| 11,521,245 B1 * | 12/2022 | Brandt .............. G06Q 20/3223 | |
| 11,551,696 B1 | 1/2023 | Brandt et al. | |
| 11,631,127 B1 | 4/2023 | Brandt et al. | |
| 2003/0028498 A1 * | 2/2003 | Hayes-Roth ........... G06N 20/00 706/17 | |
| 2005/0097033 A1 | 5/2005 | Pretell et al. | |
| 2005/0156026 A1 | 7/2005 | Ghosh et al. | |
| 2006/0074788 A1 | 4/2006 | Grizack et al. | |
| 2008/0103781 A1 | 5/2008 | Wasson et al. | |
| 2009/0103730 A1 | 4/2009 | Ward et al. | |
| 2009/0119190 A1 | 5/2009 | Realini | |
| 2010/0106498 A1 | 4/2010 | Morrison | |
| 2010/0131413 A1 | 5/2010 | Kranzley et al. | |
| 2010/0169789 A1 | 7/2010 | Cheng et al. | |
| 2010/0250421 A1 | 9/2010 | Ariff et al. | |
| 2010/0318576 A1 | 12/2010 | Kim | |
| 2011/0010173 A1 * | 1/2011 | Scott ....................... G10L 21/10 704/235 | |
| 2011/0182283 A1 * | 7/2011 | Van Buren .......... H04M 7/0066 704/270.1 | |
| 2012/0150728 A1 | 6/2012 | Isaacson et al. | |
| 2012/0173464 A1 | 7/2012 | Tur et al. | |
| 2012/0185397 A1 | 7/2012 | Levovitz | |
| 2012/0197794 A1 | 8/2012 | Grigg et al. | |
| 2012/0227094 A1 | 9/2012 | Begen et al. | |
| 2012/0316916 A1 | 12/2012 | Andrews et al. | |
| 2013/0030994 A1 | 1/2013 | Calman et al. | |
| 2013/0054474 A1 | 2/2013 | Yeager | |
| 2013/0085931 A1 | 4/2013 | Runyan | |
| 2013/0091212 A1 | 4/2013 | Rajakarunanayake | |
| 2013/0091582 A1 | 4/2013 | Chen et al. | |
| 2013/0159173 A1 | 6/2013 | Sivaraman et al. | |
| 2013/0167196 A1 | 6/2013 | Spencer et al. | |
| 2013/0262290 A1 | 10/2013 | Hanson | |
| 2013/0262294 A1 | 10/2013 | Green et al. | |
| 2013/0262317 A1 | 10/2013 | Collinge et al. | |
| 2013/0339114 A1 | 12/2013 | Plut | |
| 2013/0339234 A1 | 12/2013 | Prakash et al. | |
| 2014/0040129 A1 | 2/2014 | Akin | |
| 2014/0114735 A1 | 4/2014 | Isaacson et al. | |
| 2014/0122592 A1 | 5/2014 | Houston et al. | |
| 2014/0136365 A1 | 5/2014 | Nista | |
| 2014/0156328 A1 | 6/2014 | Grigg et al. | |
| 2014/0244476 A1 | 8/2014 | Shvarts et al. | |
| 2014/0278676 A1 | 9/2014 | Burka | |
| 2014/0331278 A1 | 11/2014 | Tkachev | |
| 2014/0351118 A1 | 11/2014 | Zhao | |
| 2014/0351130 A1 | 11/2014 | Cheek et al. | |
| 2014/0351328 A1 | 11/2014 | Woods et al. | |
| 2014/0365332 A1 | 12/2014 | Sutton et al. | |
| 2015/0019229 A1 | 1/2015 | Fish | |
| 2015/0037781 A1 * | 2/2015 | Breed ....................... G09B 7/00 434/362 | |
| 2015/0073952 A1 | 3/2015 | Ventura et al. | |
| 2015/0073959 A1 | 3/2015 | Connors et al. | |
| 2015/0100482 A1 | 4/2015 | Zamer et al. | |
| 2015/0120345 A1 | 4/2015 | Rose | |
| 2015/0189085 A1 | 7/2015 | Riahi et al. | |
| 2015/0206135 A1 | 7/2015 | Scipioni et al. | |
| 2015/0227941 A1 | 8/2015 | Tuchman et al. | |
| 2015/0242911 A1 | 8/2015 | Zises | |
| 2015/0331666 A1 | 11/2015 | Bucsa et al. | |
| 2016/0008622 A1 | 1/2016 | Mohamed et al. | |
| 2016/0012465 A1 | 1/2016 | Sharp | |
| 2016/0019472 A1 | 1/2016 | Javit | |
| 2016/0035353 A1 | 2/2016 | Chen et al. | |
| 2016/0086222 A1 | 3/2016 | Kurapati | |
| 2016/0117651 A1 | 4/2016 | Davis | |
| 2016/0125470 A1 | 5/2016 | Myers | |
| 2016/0180465 A1 | 6/2016 | Deperro et al. | |
| 2016/0197993 A1 | 7/2016 | Perkowski et al. | |

(56) References Cited

U.S. PATENT DOCUMENTS

| | | | |
|---|---|---|---|
| 2016/0232546 | A1 | 8/2016 | Ranft et al. |
| 2016/0232719 | A1 | 8/2016 | Brinig et al. |
| 2016/0253702 | A1 | 9/2016 | Gonzales, Jr. |
| 2016/0253710 | A1 | 9/2016 | Publicover et al. |
| 2016/0321582 | A1 | 11/2016 | Broudou et al. |
| 2016/0360382 | A1 | 12/2016 | Gross et al. |
| 2017/0040018 | A1 | 2/2017 | Tormey |
| 2017/0150337 | A1 | 5/2017 | Bareket et al. |
| 2017/0323345 | A1 | 11/2017 | Flowers et al. |
| 2017/0372429 | A1 | 12/2017 | La Placa |
| 2018/0077138 | A1 | 3/2018 | Bansal et al. |
| 2018/0096366 | A1* | 4/2018 | Jain .................. G06Q 30/0201 |
| 2018/0101881 | A1 | 4/2018 | Tian et al. |
| 2018/0182383 | A1 | 6/2018 | Kim et al. |
| 2018/0191695 | A1 | 7/2018 | Lindemann |
| 2018/0376002 | A1 | 12/2018 | Abraham |
| 2019/0199715 | A1 | 6/2019 | May |
| 2019/0304576 | A1 | 10/2019 | Mendoza |
| 2019/0311791 | A1 | 10/2019 | St. Paul |
| 2020/0007530 | A1 | 1/2020 | Mohamad Abdul et al. |

FOREIGN PATENT DOCUMENTS

| | | | |
|---|---|---|---|
| WO | WO-2012/136986 | A1 | 10/2012 |
| WO | WO-2012/136987 | A1 | 10/2012 |

OTHER PUBLICATIONS

Agadakos, et al., "Location-enhanced Authentication using the IOT," in ACSAC, 2016 (Year: 2016).

Bedra et al., "Design Best Practices for an Authentication System," IEEE Cyber Security. Jun. 2, 2016 (Year: 2016).

DC Software Arts, "Trip Splitter—Track shared expenses and easily even up", http://www.dcsoftwarearts.com/tripsplitter, Apr. 7, 2017; 4 pages.

Ion et al., "Don't Trust POS Terminals! Verify in-shop payments with your phone", 2010, 10 pages.

Lopez et al., "Advice goes virtual: how new digital investment services are changing the wealth management landscape", Journal of Financial Perspectives 3.3, Jan. 21, 2015.

Susham et.al, in "A Group Policy Based Authentication for Cloud Sharing," (Year: 2016).

A. A. Handzel and P. S. Krishnaprasad, "Biomimetic sound-source localization," in IEEE Sensors Journal, vol. 2, No. 6, pp. 607-616, Dec. 2002, doi: 10.1109/JSEN .2002.807772. (Year: 2002).

Azizyan, M., Constandache, I., & Roy Choudhury, R. (Sep. 2009). Surroundsense: mobile phone localization via ambience fingerprinting. In Proceedings of the 15th annual international conference on Mobile computing and networking (pp. 261-272). (Year: 2009).

Maximo Cobos, Fabio Antonacci, Anastasios Alexandridis, Athanasios Mouchtaris, Bowan Lee, "A Survey of Sound Source Localization Methods in Wireless Acoustic Sensor Networks", Wireless Communications and Mobile Computing, vol. 2017, Article ID 3956282, 24 pages, 2017. (Year: 2017).

Markowitz, J.A., 2000. Voice biometrics. Communications of the ACM, 43(9), pp. 66-73. (Year: 2000).

Teixeira, T., Dublon, G. and Sawides, A, 2010. A survey of human-sensing: Methods for detecting presence, count, location, track, and identity. ACM Computing Surveys, 5(1), pp. 59-69. (Year: 2010).

Zhao, H. and Malik, H., 2013. Audio recording location identification using acoustic environment signature. IEEE Transactions on Information Forensics and Security, 8(11 ), pp. 1746-1759. (Year: 2013).

\* cited by examiner

Today's Summary

GOALS
Goal 1: Buy New Car
Target Date: November 2018 (11 months)
Estimated Purchase Value: $28,800
Estimated Monthly Payment: $539

Goal 2: College Fund
Target Date: August 2028 (10 years 8 months)
Estimated Purchase Value: $40,000

ACCOUNTS
Acct 1: Checking
Balance: $5,600

Acct 2: Savings
Balance: $3,500

Acct 3: Credit Card
Balance / Limit: $2,450 / $15,000

Family

Team

PROACTIVE LISTENING BOT-PLUS PERSON ADVICE CHAINING

CROSS REFERENCE TO RELATED APPLICATIONS

This application is a continuation application of U.S. patent application Ser. No. 17/195,092 entitled "Proactive Listening Bot-Plus Person Advice Chaining," filed Mar. 8, 2021, which is a continuation application of U.S. patent application Ser. No. 16/381,207 entitled "Proactive Listening Bot-Plus Person Advice Chaining," filed Apr. 11, 2019 which claims priority to U.S. Provisional Patent Application No. 62/666,587 entitled "Systems And Methods For Proactive Listening Bot-Plus Person Advice Chaining," filed May 3, 2018, U.S. Provisional Patent Application No. 62/666,591 entitled "Systems And Methods For Pervasive Advisor For Major Expenditures," filed May 3, 2018, U.S. Provisional Patent Application No. 62/656,750 entitled "Systems And Methods For Authentication Circle Management," filed Apr. 12, 2018, and U.S. Provisional Patent Application No. 62/656,753 entitled "Systems And Methods For Authentication Circle Shared Expenses With Extended Family And Friends," filed Apr. 12, 2018, each of which is incorporated herein by reference in its entirety.

BACKGROUND

People are often unintentional about how they spend money. Without necessarily realizing it, many people tend to spend more than they can afford. The financial health of a person is correlated to the financial decisions that person makes, but a significant number of people tend not to be aware of what affirmative steps they can take to improve their financial situation. Often times people have difficulty keeping track of their finances and managing their credit. Beyond being more informed about their account balances, users often lack information on actions they could take and how those actions would impact their financial situation. Sometimes, people may mistakenly believe that they lack sufficient financial assets to have additional options or to warrant seeking financial advice. And many may feel they do not have the time or energy to devote to figuring out their options.

Moreover, as a result of certain life events, or in anticipation of an event that may warrant an adjustment to personal finances, a person may desire to get their finances under control in order to meet a financial goal. However, even though a person may realize that a life event could have substantial effects on their finances, the person often is not sufficiently well-informed to know where to begin. A person may generally appreciate there are opportunities and pitfalls, but may be frozen into inaction over uncertainty about when it is time to seek advice.

Further, people normally appreciate that, with the right help, they could enhance their financial situation. But finding the help that is needed is often a challenge. Sometimes people lack knowledge about the roles and abilities of types of professionals, and do not know which ones (or how) to contact for professional help. Often, a person who wants the aid of a financial professional blindly initiates contact by going into a physical location, like a bank, or calling a professional over the phone without knowing whether the professional is well-suited to help based on the person's particular financial and life circumstances. In the alternative, the person sometimes relies on non-professional suggestions or does not obtain the advice needed at all. And even if a professional with the right background is found, arranging a meeting or discussion can be another challenge. The process of comparing schedules and finding a time that is convenient for the customer and that fits with the professional's schedule can be daunting, especially if last-minute meetings and commitments require flexibility in scheduling.

And when a customer finally is able to connect with a professional, the interactions are often inefficient and unnecessarily time-consuming because the customer must spend a significant amount of time bringing the professional "up to speed" by explaining his or her life circumstances, financial situation, motivations for seeking help, overall needs and concerns, etc. Sometimes, after the professional is brought up to speed, it becomes apparent that the customer's needs are more well-suited for a different professional for various reasons, and the customer may be back at "square one," having to find another professional, arrange for another meeting or discussion, and once again explain his or her situation to bring the new professional up to speed. The process can sometimes feel insurmountable with seemingly countless options for financial products and professionals, and countless variables affecting the choices that can or should be made. And with other time commitments in life, many customers may put off seeking help, perhaps indefinitely, and thus do not benefit from needed services that could help them achieve their goals.

Furthermore, sometimes a financial professional's assistance is needed for a short time, for a small part of the advising process, or intermittently as needs arise. But it can be very time consuming and inefficient to reach out to professionals for "small chunks" of assistance because the customer must take time to explain changes in his or her situation to fill in the gaps for the professional each time there is an interruption in service. And in the interim, the customer is often without adequate tools that could help the customer stay on track based on the advice of the professional, and to seamlessly return to the professional for advice only when needed. On the flip side, an advisor serving a customer may provide the assistance that required his or her particular expertise, but the customer may also take the advisor's time for issues that could then be handled just as well without the advisor's help, making the process less efficient for the advisor.

Current technologies are not able to meet the needs of customers and advisors. Smart speakers, for example, may listen for a request for information (such as the weather or the contents of an incoming text message), but such user devices are not capable of understanding a user's needs and providing recommendations based on the user's circumstances. And even if such devices were capable of providing useful recommendations to users, even as the user's circumstances change, the devices do not identify situations in which the device's capabilities are inadequate in some way based on the particular needs of a customer, and provide a mechanism for efficiently transitioning to a human advisor. And moreover, user devices do not take the information discussed with others or assistance received from human advisors into account in making future recommendations. The user's goals and strategies may have changed based on the assistance of the human advisor, and any recommendations from the user device would not effectively reflect such changes.

What are needed are systems and methods that address one or more of the above, as well as other, shortcomings of conventional approaches.

SUMMARY

Example systems and methods relate to providing a pervasive user experience capable of integrating robo-advising with human advising. Conversations and other inputs may be actively captured to identify issues with which the system may be able to assist. Inputs from multiple conversations separated in time may be correlated to identify relevant needs and goals. Recommendations and strategies may be developed and presented to the customer. When it is determined that human advising is appropriate for one or more issues, the customer may be connected to an advisor for assistance with particular issues. Transitions may be facilitated to allow customers to more efficiently return to robo-advising until human advising is again deemed appropriate.

Various embodiments of the disclosure relate to a service provider computing system. The service provider computing system may comprise a database with a user profile corresponding to a user. The service provider computing system may also comprise a network interface configured to communicatively couple the service provider computing system to computing devices. The network interface may be configured to communicatively couple the service provider computing system to a first computing device. The first computing device may have a sound sensor for detecting ambient sounds. The first computing device may also have a first set of one or more user interfaces. The first set of user interfaces may be for perceptibly presenting information to the user and/or for receiving user inputs. The network interface may also be configured to communicatively couple the service provider computing system to a second computing device. The second computing device may have a second set of one or more user interfaces. The second set of user interfaces may be for perceptibly presenting information to an advisor and/or for receiving advisor inputs. At least one of the first computing device and the service provider computing system may be configured to detect a goal. The first computing device and/or the service provider computing system may be configured to detect the goal by capturing ambient sounds using the sound sensor of the first computing device. The first computing device and/or the service provider computing system may also be configured to detect the goal by extracting a set of one or more voice inputs. The set of voice inputs may be of the user. The set of voice inputs may be extracted from a subset of the ambient sounds captured using the sound sensor. The first computing device and/or the service provider computing system may moreover be configured to detect the goal by identifying the goal based at least on an analysis of the set of voice inputs. The first computing device and/or the service provider computing system may also be configured to initiate a live communication session. The live communication session may be initiated between the first and second computing devices. The first computing device and/or the service provider computing system may moreover be configured to present a virtual dashboard via the first and second sets of user interfaces during the live communication session. The virtual dashboard may be configured to perceptibly present an identification of the goal. The identification of the goal may be perceptibly presented via the second set of user interfaces.

In one or more implementations, at least one of the first computing device and the service provider computing system may be configured to identify select data from the user profile relevant to the goal. The virtual dashboard may be configured to perceptibly present the select data.

In one or more implementations, the sound sensor of the first computing device may be configured to pervasively capture ambient sounds to detect goals.

In one or more implementations, at least one of the first computing device and the service provider computing system may be configured to detect an urgency of the goal. The urgency of the goal may be detected based on at least one of speed, tone, or aggression of user speech.

In one or more implementations, the virtual dashboard may be configured to perceptibly present a graphic depiction of the user's progress towards achieving the goal.

In one or more implementations, the virtual dashboard may be configured to present at least one of an advisor image, an advisor video, and an advisor audio.

In one or more implementations, the virtual dashboard may be configured to present inputs received via the second set of user interfaces. The inputs may be presented via the first set of user interfaces. The inputs may be received following presentation of the identification of the goal.

In one or more implementations, the set of voice inputs may be identified based at least in part on a biometric voice signature of the user.

In one or more implementations, the ambient sounds include voice inputs of a second user. The voice inputs of the second user may be excluded from the set of voice inputs. The voice inputs of the second user may be excluded based on a mismatch with the biometric voice signature of the user.

In one or more implementations, the virtual dashboard may be configured to present information exchanged during a prior live communication session. The information may be presented via the second set of user interfaces.

In one or more implementations, at least one of the first computing device and the service provider computing system may be configured to initiate a first robo-advising session. The first robo-advising session may be initiated before initiating the live communication session. The virtual dashboard may be configured to present an activatable link. The activatable link may be activatable via the first and/or second set of user interfaces. When activated, the activatable link may terminate the live communication session. Additionally or alternatively, when activated, the activatable link may initiate a second robo-advising session.

In one or more implementations, the sound sensor is a first sound sensor. The second computing device may comprise a second sound sensor. At least one of the first computing device, the second computing device, and the service provider computing device may be configured to detect the goal. The goal may be detected based on a combination of multiple fragmented issue indicators. The fragmented issue indicators may be identified in multiple voice inputs. The voice inputs may be captured using the first and second sound sensors of the first and second computing devices. The first and second computing devices may be determined to be associated with members of a same authentication circle.

In one or more implementations, the set of voice inputs may be a first set of voice inputs. The user may be a first user. At least one of the first computing device and the service provider computing system may be configured to extract a second set of one or more voice inputs. The second set of voice inputs may be of a second user. The second set of voice inputs may be extracted from the subset of the ambient sounds captured using the sound sensor. At least one of the first computing device and the service provider computing system may also be configured to identify the goal based at least on an analysis of both the first and second sets of voice inputs. The first and second sets of voice inputs may be determined to be associated with members of a same authentication circle.

In one or more implementations, the first and second sets of voice inputs may be separated by multiple days.

In one or more implementations, at least one of the first computing device and the service provider computing system may be configured to detect a robo-advising transition trigger. The robo-advising transition trigger may be detected during the live communication session. At least one of the first computing device and the service provider computing system may also be configured to terminate the live communication session. At least one of the first computing device and the service provider computing system may moreover be configured to initiate a robo-advising session.

In one or more implementations, the live communication session is a first live communication session. At least one of the first computing device and the service provider computing system may be configured to detect a human-advising transition trigger. At least one of the first computing device and the service provider computing system may be configured to detect the human-advising transition trigger during the robo-advising session. At least one of the first computing device and the service provider computing system may also be configured to initiate a second live communication session between the first and second computing devices. The second live communication session may be initiated in response to detection of the human-advising transition trigger. At least one of the first computing device and the service provider computing system may moreover be configured to provide the virtual dashboard to the first and second computing devices during the second live communication session. The virtual dashboard being may be configured to perceptibly present information exchanged between the first and second devices during the first live communication session and/or during the robo-advising session.

In one or more implementations, at least one of the first computing device and the service provider computing system may be configured to present information from the first live communication session and/or the robo-advising session. The information may be presented via the second set of user interfaces.

Various embodiments of the disclosure relate to a computing device. The computing device may comprise a sound sensor for detecting ambient sounds. The computing device may also comprise a first set of one or more user interfaces for perceptibly presenting information to a user and/or for receiving user inputs. The computing device may moreover comprise a network interface configured to communicatively couple the computing device to a second computing device. The second computing device may have a second set of one or more user interfaces for perceptibly presenting information to an advisor and/or for receiving advisor inputs. The computing device may additionally comprise a processor and memory having instructions that, when executed by the processor, cause the processor to perform specific functions. The computing device may be configured to detect a sound sample using the sound sensor. The computing device may also be configured to extract a set of one or more voice inputs of the user from the sound sample. The computing device may moreover be configured to identify a goal. The goal may be identified based at least on an analysis of the set of voice inputs. The computing device may additionally be configured to initiate a live communication session. The live communication session may be initiated with the second computing device. The computing device may further be configured to present a virtual dashboard during the live session. The virtual dashboard may be presented via the first set of user interfaces. The virtual dashboard may be configured to perceptibly present an identification of the goal. The identification of the goal may be presented via the second set of user interfaces.

In one or more implementations, the network interface may be configured to communicatively couple the computing device to a service provider computing system. The service provider computing system may store a user profile corresponding with the user. The user profile may be stored in a database. The virtual dashboard may be configured to present select data from the user profile. The select data may be presented, via the second set of user interfaces. The select data may be determined to be relevant to the goal by at least one of the computing device, the second computing device, and the service provider computing system. The virtual dashboard may also be configured to present inputs via the first set of user interfaces. The presented inputs may be received via the second set of user interfaces. The presented inputs may be received following presentation of the select data.

In one or more implementations, the virtual dashboard may be configured to present a graphic depiction of the user's progress towards achieving the goal.

Various embodiments of the disclosure relate to a method. The method may comprise detecting ambient sounds. The ambient sounds may be detected pervasively. The detected sounds may be detected using a sound sensor of a first computing device. The method may also comprise extracting a set of one or more voice inputs of a user. The voice inputs may be extracted from a subset of the ambient sounds. The method may moreover comprise identifying a goal of the user. The goal may be identified based at least on an analysis of the set of voice inputs. The method may additionally comprise initiating a live communication session between the first computing device and a second computing device. The method may further comprise providing a virtual dashboard. The virtual dashboard may be configured to an identification of the goal. The goal may be presented perceptibly to the second computing device.

In one or more implementations, the method may comprise initiating a robo-advising session. The robo-advising session may be initiated before initiating the live communication session. The method may also comprise perceptibly presenting information from the robo-advising session during the live communication session. The information may be presented in the virtual dashboard.

In one or more implementations, the virtual dashboard may be configured to present a graphical depiction of the user's progress towards achieving the identified goal.

In one or more implementations, the method may comprise detecting a robo-advising transition trigger. The robo-advising trigger may be detected during the live communication session. The method may also comprise terminating the live session. The live session may be terminated in response to detection of the robo-advising transition trigger.

In one or more implementations, detecting the robo-advising transition trigger during the live session may comprise receiving a signal indicating activation of a visually-perceptible link. The signal may be received via one of the user interfaces of the first and/or second computing devices. The link may be indicating a desire to return to robo-advising.

Various embodiments of the disclosure relate to a method. The method may comprise detecting a first sound sample. The first sound sample may be detected using a sound sensor of a first device. The sound sensor may be configured to pervasively capture ambient sounds. The method may also comprise analyzing the first sound sample. The first sound sample may be analyzed to detect a first voice input based at least in part on a biometric voice signature of a user. The method may moreover comprise detecting an advising trigger. The advising trigger may be detected based at least in part on the first voice input. The method may additionally comprise initiating a robo-advising session. The method may further comprise initiating a human advising session. Initiating the human advising session may comprise initiating a live communication session. The live communication session may be initiated between the first device and a second device of a human advisor. Initiating the human advising session may also comprise perceptibly presenting a virtual dashboard. The virtual dashboard may include graphical elements configured to facilitate the human advising session between the first and second devices.

In one or more implementations, the advising trigger is detection of a goal.

In one or more implementations, the method comprises detecting an urgency of the goal. The urgency of the goal may be detected based on at least one of speed, tone, or aggression of user speech.

In one or more implementations, the virtual dashboard may be configured to perceptibly present an identification of the goal. The identification of the goal may be presented via one or more user interfaces of the second device.

In one or more implementations, the advising trigger is a spoken request for advising.

In one or more implementations, the advising trigger is a detection of a transaction. The transaction may be executed using the first device.

In one or more implementations, the transaction is a financial transaction. The financial transaction may be implemented via a mobile wallet application. The mobile wallet application may be running on the first device.

In one or more implementations, the advising trigger is detection of a physical location. The physical location may be detected using a location sensor. The physical location may be a predetermined physical location. The location sensor may be a sensor of the first device.

In one or more implementations, the virtual dashboard may be configured to perceptibly present an identification of the advising trigger.

In one or more implementations, the robo-advising session may comprise detecting a goal. The goal may be detected based at least on the first voice input. The robo-advising session may also comprise formulating a first action item for bringing the user closer to achieving the goal. The first action item may be formulated based at least in part on a user profile. The user profile may correspond to the user. The robo-advising session may also moreover comprise presenting the first action item via one or more user interfaces. The first action item may be presented via user interfaces of the first device.

In one or more implementations, the robo-advising session may comprise receiving one or more inputs. The one or more inputs may be received via the first device.

In one or more implementations, the robo-advising session may comprise detecting a human advising transition trigger. The human advising transition trigger may be detected in the one or more inputs. The human advising session may be initiated in response to detection of the human advising transition trigger.

In one or more implementations, the robo-advising session may comprise detecting a goal. The goal may be detected based at least in part on one or more inputs.

In one or more implementations, the robo-advising session may comprise formulating a first action item for bringing the user closer to achieving the goal. The first action item may be formulated based on the one or more inputs and/or on a user profile corresponding to the user. The robo-advising session may also comprise perceptibly presenting the first action item. The first action item may be presented via one or more user interfaces of the first device.

In one or more implementations, receiving the one or more inputs via the first device may comprise detecting a second sound sample. The second sound sample may detected using the sound sensor. The second sound sample may be detected following presentation of the first action item. Receiving the one or more inputs via the first device may also comprise analyzing the second sound sample to detect a second voice input.

In one or more implementations, the robo-advising session may comprise formulating a second action item. The second action item may be formulated based on the second voice input and/or on the user profile. The robo-advising session may also comprise perceptibly presenting the second action item. The second action item may be presented via one or more user interfaces of the first device.

In one or more implementations, the robo-advising session may be a first robo-advising session. The human advising session may further comprise detecting a robo-advising transition trigger. The robo-advising transition trigger may be detected during the live communication session. The method may also comprise terminating the human advising session. The method may moreover comprise initiating a second robo-advising session. The second robo-advising session may be initiated in response to detection of the robo-advising trigger.

Various embodiments of the disclosure relate to a service provider computing system. The service provider computing system may comprise a database with a user profile corresponding to a user. The service provider computing system may also comprise a network interface configured to communicatively couple the service provider computing system to a first device. The first device may have a sound sensor for detecting ambient sounds. The first device may also have a first set of one or more user interfaces for perceptibly presenting information to the user and/or for receiving user inputs. The network interface may also be configured to communicatively couple the service provider computing system to a second device. The second device may have a second set of one or more user interfaces for perceptibly presenting information to an advisor and/or for receiving advisor inputs. At least one of the first device and the service provider computing system may be configured to detect a first sound sample. The first sound sample may be detected using the sound sensor of the first device. The sound sensor may be configured to pervasively capture ambient sounds. At least one of the first device and the service provider computing system may also be configured to analyze the first sound sample. The first sound sample may be analyzed to detect a first voice input. The first voice input may be detected based at least in part on a biometric voice signature of a user. At least one of the first device and the service provider computing system may moreover be configured to detect an advising trigger. The advising trigger may be detected based at least in part on the first voice input. At least one of the first device and the service provider computing system may additionally be configured to initiate a robo-advising session. At least one of the first device and the service provider computing system may further be configured to initiate a human advising session. The human advising session may comprise initiating a live communication session. The live communication session may be initiated between the first device and the second device. The human advising session may also comprise perceptibly presenting a virtual dashboard. The virtual dashboard may comprise graphical elements configured to facilitate the human advising session between the first and second devices. The virtual dashboard may be configured to perceptibly present a subset of the user profile.

In one or more implementations, the advising trigger may be detection of a goal. The virtual dashboard may be configured to perceptibly present the goal and/or a graphic depiction of the user's progress towards achieving the goal.

In one or more implementations, the robo-advising session may comprise detecting a goal. The goal may be detected based at least on the first voice input. The robo-advising session may also comprise formulating a first action item for bringing the user closer to achieving the goal. The first action item may be formulated based at least in part on a user profile corresponding to the user. The robo-advising session may moreover comprise presenting the first action item via one or more user interfaces of the first device.

Various embodiments of the disclosure relate to a computing device. The computing device may comprise a sound sensor for detecting ambient sounds. The computing device may also comprise a first set of one or more user interfaces for perceptibly presenting information to a user and/or for receiving user inputs. The computing device may moreover comprise a network interface configured to communicatively couple the computing device to a second computing device. The second device may have a second set of one or more user interfaces for perceptibly presenting information to an advisor and/or for receiving advisor inputs. The computing device may additionally comprise a processor and memory having instructions that, when executed by the processor, cause the processor to perform specific functions. The computing device may be configured to detect a first sound sample using the sound sensor. The sound sensor may be configured to pervasively capture ambient sounds. The computing device may also be configured to analyze the first sound sample to detect a first voice input. The first voice input may be detected based at least in part on a biometric voice signature of a user. The computing device may moreover be configured to detect an advising trigger. The advising trigger may be detected based at least in part on the first voice input. The computing device may additionally be configured to initiate a robo-advising session. The computing device may further be configured to initiate a human advising session. The human advising session may comprise initiating a live communication session. The live communication session may be initiated between the first device and the second device. The human advising session may also comprise perceptibly presenting a virtual dashboard. The virtual dashboard may comprise graphical elements configured to facilitate the human advising session between the first and second devices.

In one or more implementations, the robo-advising session may comprise detecting a goal. The goal may be detected based at least on the first voice input. The robo-advising session may also comprise presenting the first action item via the first set of user interfaces.

In one or more implementations, the instructions may cause the processor to detect a robo-advising transition trigger during the live communication session. The instructions may also cause the processor to terminate the live communication session. The live communication session may be terminated in response to detection of the robo-advising transition trigger.

These and other features, together with the organization and manner of operation thereof, will become apparent from the following detailed description when taken in conjunction with the accompanying drawings.

DETAILED DESCRIPTION

Figure 1:
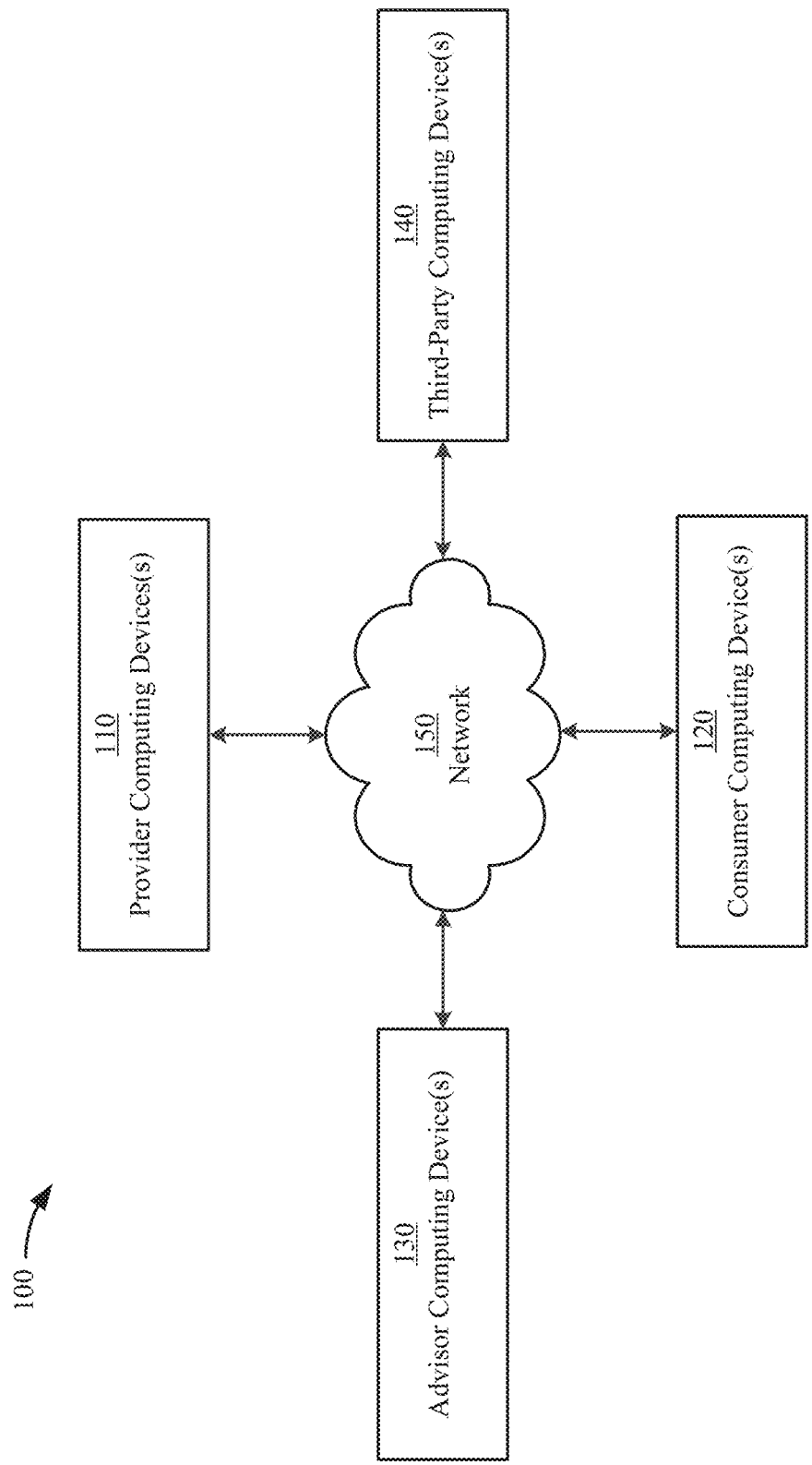
FIG. 1 is a block diagram of an example computing system framework for pervasive advising according to example embodiments.

Disclosed is an approach for providing a pervasive user experience capable of effectively integrating robo-advising with as-needed human advising. Example systems and methods may include a proactive listening bot and/or other consumer computing devices configured to actively detect conversations and determine that a financial issue is being discussed. Based on the financial discussions, a financial strategy may be developed. As used herein, the term "financial strategy" may be used to refer to a strategy generated to meet a financial goal. A financial strategy may include a financial plan, budget, investment strategy, or combination thereof. The system may include one or more consumer computing devices in communication with a computing system of a provider, which may be a financial institution. A consumer computing device may be structured to detect a voice input, and the consumer computing device and/or the provider computing system may determine that a financial goal (e.g., a major expenditure, credit repair, transaction, or purchase such as a vacation, new home, expensive jewelry, or any other purchase requiring substantial funding) was or is being discussed. The consumer computing devices may communicate or otherwise present (via, e.g., an application that generates a virtual dashboard or other user interface) a financial strategy for meeting the financial goal in response to the detection of the voice input and identification of the financial goal. The connected computing device and/or provider computing system may advise a customer to connect with an advisor computing device of an advisor (who need not be associated with the provider) based on, for example, the customer's financial goals. The system may match the customer with a suitable advisor, schedule a meeting, and facilitate a discussion via, for example, an application running on the consumer computing device that connects the consumer computing device with the advisor computing device. The user computing device, advisor computing device, and/or provider computing device may update the financial goals and/or financial strategy (e.g., by extracting relevant information exchanged or discussed in the meeting), and continue advising the user as before, informed by the information exchanged in the meeting, until another issue warranting connection with an advisor computing device is identified and the user wishes to connect with the same (or another) advisor computing device.

Embodiments and implementations of the systems and methods disclosed herein improve current computing systems by providing proactive and pervasive user experiences involving seamless or otherwise substantially enhanced) transitions between robo-advising and human advising. In some implementations, financial goals affecting multiple users may be identified based on, for example, already-known associations of computing devices of existing customers with a provider computing system and/or with an authentication circle. The system may include mechanisms (e.g., digital voice assistants, biometric scanners, and so on) for authenticating users to enable simultaneous financial advising for multiple users. Identities may be verified in various ways to prevent fraudulent activity and to ensure that each person who interacts with the proactive listening bot operates under the proper security roles and permissions. A "ubiquitous" proactive listening bot (i.e., a bot that may be configured to detect signals using multiple or all computing devices of one or more customers (and/or members of an authentication circle) at all times or until turned off or otherwise deactivated) can be structured to identify financial goals and needs that users may be able to identify for themselves due to a lack of information or expertise. Users who may not be aware of a potential strategy for improving their financial health need not manually enter a large quantity of information that may be irrelevant (by, e.g., answering a large number of questions that are intended to reveal ("fish" for) financial issues that may or may not exist). Without such requirements, the computing resources needed (e.g., processing time, programmatic instructions, memory utilization, etc.), are reduced.

In some situations, advise from a professional may be needed. However, even after the right advisor is found, connecting with the advisor and providing needed information is a time-consuming and inefficient process. For example, professional advisors tend to use their own devices and are generally part of separate computing environments. By matching a user with the right advisor based on information acquired proactively (by, e.g., listening to the user and without requiring separate user entry), and by allowing calendar sharing and syncing, the user is able to easily find an advisor and schedule meetings in less time and with reduced demand for computing resources.

Moreover, conventionally, to provide an advisor with financial information about him/herself (and others affected by the user's financial health), the user could share his or her login credentials to allow the advisor to access the user's financial accounts to retrieve the information needed. However, this is a great security risk, is likely to share too much personal information, and can be over-inclusive (requiring the advisor to spend additional time extracting relevant information from a large amount of data). And after each interaction with the advisor, the customer conventionally must manually update his or her financial records. By interfacing with the advisor's system, security risks are reduced, as are the time and processing resources required to keep financial records updated. The facilitated transitions between robo-advising and human advising disclosed herein involves an unconventional solution to a technological problem.

Further, the disclosed approach improves computing systems by using one or more computing devices to interact with a user (e.g., a customer) via voice recognition and analytics that pervasively and interactively provide financial planning advice to users. Rather than requiring a user to dedicate time and computing resources to determining one's financial needs and goals and researching available options (e.g., by filling out a questionnaire intended to identify issues/needs/goals and seeking sources of information from various databases), user devices can acquire the information without requiring the user to dedicate time or otherwise change daily activities. User computing devices are not limited to single, one-time statements in determining customer goals and needs, but can obtain the needed information over the course of a day, a week, a month, or longer, based on multiple conversations with family and friends (and/or with members of one or more authentication circles with which the user is associated), consultations with advisors, and/or other activities. This saves a computing device from having to either remain silent because not enough is known to provide a relevant or useful recommendation, or provide recommendations that are likely to be irrelevant or unhelpful because they are based on tidbits of information or on assumptions and/or conjecture. Systems, methods, and computer implementations disclosed herein improve the functioning of such systems and information management by providing unconventional, inventive functionalities that are novel and non-obvious improvements over current systems.

Referring to FIG. 1, a block diagram of a proactive advising system 100 is shown according to one or more example embodiments. As described herein, the proactive advising system 100 enables the implementation of pervasive user experiences involving facilitated transitions between robo-advising and human advising. As used herein, robo-advising, bot advising, robot advising, and like terms refer to advising that does not involve interaction with, or intervention by, a person. Robo-advising may be implemented using one or more mobile or non-mobile computing devices capable of acquiring inputs from a user (e.g., a user's communications) and automatically performing actions, or providing recommendations for future actions by the user, that affect the user's circumstances. The robo-advising may be accomplished using, for example, artificial intelligence tools, intelligent agents, machine learning, or other logic and algorithms capable of extracting relevant information from input streams that include both relevant and non-relevant information (e.g., conversations that may span multiple days and cover related and unrelated topics).

The proactive advising system 100 includes one or more provider computing devices 110 (of one or more service providers), one or more consumer computing devices 120 (of one or more users receiving one or more financial or other services from the service provider), one or more advisor computing devices 130 (of one or more persons who advise users, and who may or may not be associated with the service provider), and one or more third-party computing devices 140 (of entities that are separate from the service provider). Each provider computing device 110, consumer computing device 120, advisor computing device 130, and third-party computing device 140 may include, for example, one or more mobile computing devices (e.g., smartphones, tablets, laptops, smart devices such as home smart speakers and watches, etc.), non-mobile computing devices (such as desktop computers, workstations, servers, etc.), or a combination thereof.

Provider computing devices 110, consumer computing devices 120, advisor computing devices 130, and third-party computing devices 140 may be communicably coupled to each other over a network 150, which may be any type of communications network. The network 150 may involve communications using wireless network interfaces (e.g., 802.11X, ZigBee, Bluetooth, near-field communication (NFC), etc.), wired network interfaces (e.g., Ethernet, USB, Thunderbolt, etc.), or any combination thereof. Communications between devices may be direct (e.g., directly between two devices using wired and/or wireless communications protocols, such as Bluetooth, Wi-Fi, NFC, etc.), and/or indirect (e.g., via another computing device using wired and/or wireless communications protocols, such as via the Internet). The network 150 is structured to permit the exchange of data, values, instructions, messages, and the like between and among the provider computing devices 110, the consumer computing devices 120, the advisor computing devices 130, and the third-party computing devices 140 via such connections.

Figure 2:
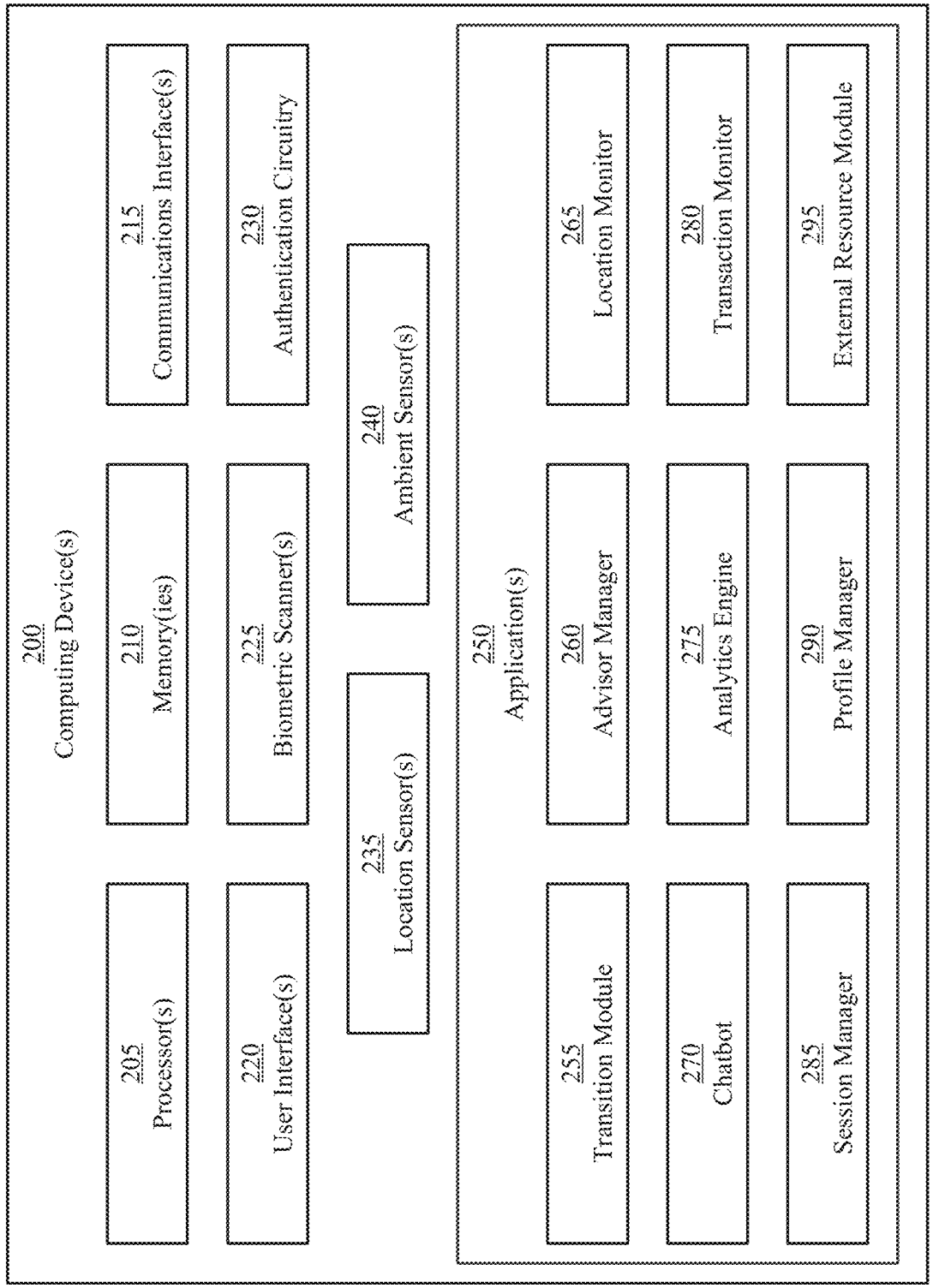
FIG. 2 is a block diagram for example components that could be incorporated in the computing devices of the computing system framework of FIG. 1 according to example embodiments.

Referring to FIG. 2, computing device 200 is representative of example computing devices that may be used to implement proactive advising system 100, such as one or more provider computing devices 110, consumer computing devices 120, advisor computing devices 130, and/or third-party computing devices 140. Not every provider computing device 110, consumer computing device 120, advisor computing device 130, and third-party computing device 140 necessarily requires or includes all of the example device components depicted in FIG. 2 as being part of computing device 200. Multiple computing devices 200 (each with a potentially different set of components, modules, and/or functions) may be used by one service provider (e.g., a financial institution providing financial and other services), one user (e.g., a customer receiving financial advice), one advisor (e.g., a professional who provides financial advice suited to a customer's circumstances), or one third party (e.g., a credit agency, government agency, merchant, or other source of information or provider of services). Similarly, one computing device 200 may be used by multiple service providers, multiple users, multiple advisors, or multiple third-parties.

Each computing device 200 may include a processor 205, memory 210, and communications interface 215. Each processor 205 may be implemented as a general-purpose processor, an application specific integrated circuit (ASIC), one or more field programmable gate arrays (FPGAs), a digital signal processor (DSP), a group of processing components, or other suitable electronic processing components structured to control the operation of the computing device 200. The memory 210 (e.g., RAM, ROM, NVRAM, Flash Memory, hard disk storage) may store data and/or computer code for facilitating at least some of the various processes described herein. In this regard, the memory 210 may store programming logic that, when executed by the processor 205, controls the operation of the computing system 200. Memory 210 may also serve as one or more data repositories (which may include, e.g., database records such as user and account data and data acquired from various sources). The communications interface 215 may be structured to allow the computing device 200 to transmit data to and receive data from other mobile and non-mobile computing devices (e.g., via network 150) directly or indirectly.

Each computing device 200 may include one or more other components (generally involving additional hardware, circuitry, and/or code) depending on the functionality of the computing device 200. User interfaces 220 include any input devices (e.g., keyboard, mouse, touchscreen, microphone for voice prompts, buttons, switches, etc.) and output devices (e.g., display screens, speakers for sound emission, notification LEDs, etc.) deemed suitable for operation of the computing device 200. Computing device 200 may also include one or more biometric scanners 225, such as fingerprint scanners, cameras for facial, retinal, or other scans, microphones for voice signatures, etc. In conjunction with, or separate from, the biometric scanners 225, each computing device 200 may include authentication circuitry 230 to allow the computing device 200 to engage in, for example, financial transactions (such as mobile payment and digital wallet services) in a more secure manner. Various computing devices 200 may include one or more location sensors 235 to enable computing device 200 to determine its location relative to, for example, other physical objects or relative to geographic locations. Example location sensors 235 include global positioning system (GPS) devices and other navigation and geolocation devices, digital compasses, gyroscopes and other orientation sensors, as well as proximity sensors or other sensors that allow the computing device 200 to detect the presence and relative distance of nearby objects and devices. Computing device 200 may also include ambient sensors 240 that allow for the detection of sound and imagery, such as cameras (e.g., visible, infrared, etc.) and microphones, in the surroundings of computing device 200. A computing device's microphone may be considered an ambient sensor that could also be used as a biometric scanner if it is involved in capturing the voice of a user for authentication purposes, and/or a user interface if the microphone is involved in receiving information, commands, or other inputs from, for example, speaking users.

Each computing device 200 may include one or more applications 250 ("apps") that aid the computing device 200 in its operations and/or aid users of the computing device 200 in performing various functions with the computing device 200. In some implementations, applications 250 may be stored in memory 210 and executed using processor 205, and may interact with, or otherwise use, one or more of communications interfaces 215, user interfaces 220, biometric sensors 225, authentication circuitry 230, location sensors 235, and/or ambient sensors 240. Not every provider computing device 110, consumer computing device 120, advisor computing device 130, and/or third-party computing device 140 necessarily requires or includes all of the example application components/modules depicted in FIG. 2 as being part of application 250.

Example components of one or more applications 250 (running on, e.g., provider computing device 110, consumer computing device 120, and/or advisor computing device 130) include a transition module 255 configured to determine whether or when it is advisable to transition a user between robo-advising and human advising based on one or more transition triggers (which are further discussed below). For example, the transition module 255 (running on provider computing device 110 or consumer computing device 120) may use inputs to determine that it is appropriate to transition a user computing device 120 from robo-advising to human advising based on one or more human advising triggers, and from human advising to robo-advising based on one or more robo-advising triggers. Such "go-human" triggers may indicate that a need or goal of a user is sufficiently complex, variable, unpredictable, or significant so as to warrant input from or review by a human advisor. For example, human advising triggers may indicate that two or more options are available for a user, with the options sufficiently divergent (i.e., having substantially different consequences depending on factors beyond the purview of the robo-advisor, and/or requiring subjective evaluation of a user's circumstances) to warrant human intervention. Example go-human triggers may include: a transaction exceeding a threshold value (e.g., investing a large sum of money); a conversation determined to indicate that a situation is very emotionally charged (based on, e.g., above-average volume for the voice of the speakers, detection of tension in voices, and/or identification of a major life event); extensive communications about a topic, suggesting that the user is weighing many factors because a financial issue is significantly nuanced or particularly personal; use of predetermined keywords or phrases associated with topics outside the purview of the robo-advisor; expression of a desire to speak with a professional advisor; etc. Go-human triggers may be identified in, for example, conversations or other communications of the customer with other users and/or with a chatbot.

Similarly, the transition module 255 (running on, e.g., provider computing device 110, user computing device 120, and/or advisor computing device 130) may determine, during a communications session between a customer and an advisor, that the customer may have reached a point that no longer requires human intervention, or that a return to robo-advising may otherwise be a viable option, based on one or more triggers for robo-advising. Such "back to bot" triggers may, for example, indicate that the motivation for transitioning to human advising may no longer be relevant (e.g., an issue has been resolved or otherwise sufficiently addressed, one or more accounts have been set up and/or restructured, etc.), that the topics being discussed (or a subset thereof) are in the purview of the robo-advisor, and/or that the conversation has become non-financial in nature (e.g., the user and advisor have concluded a discussion of life events or financial situations and are only discussing unrelated news or sports). In some implementations, if the topics being discussed during a human-advising session have no go-human triggers (such that if the discussion had been detected outside of the session with the advisor, the robo-advisor would not have determined that human intervention or review is warranted), then the transition module 255 may determine that a return to robo-advising is appropriate. Back-to-bot triggers may be identified in, for example, conversations or other communications of the customer with the advisor, such as entries while interacting with a user dashboard during a session with the advisor.

An advisor manager 260 may be configured to identify one or more advisors that may be able to assist a user based on the user's needs and/or goals, and to schedule a meeting or other communications session with the advisor (by, e.g., comparing the user's and advisor's calendars to determine mutual or overlapping availability). For example, if one or more go-human triggers are detected, or it is otherwise determined that there is a financial need or goal suited for human advising, the advisor manager may access records stored at a provider computing device 110, an advisor computing device 130, and/or a third-party computing device 140 to determine which advisors may have the background and experience suited to the customer's needs and goals. The advisor manager 260 may also access records (e.g., transcripts) of prior sessions of an advisor (with the same or with other users) to determine whether the advisor would be a good match with the user of the consumer device 120. The ultimate suitability of an advisor may sometimes be based, at least in part, on whether the calendars reveal mutual/overlapping availability for the consumer and the advisor (even if otherwise matched based on needs and expertise). The advisor manager 260 may access one or more calendars accessible to one or more consumer devices 120 to determine the customer's availability. In some implementations, the advisor manager 260 may determine the customer's availability based on discussions of the user (e.g., detecting via a consumer device 120 that the customer stated "I'm available all day Friday") or other communications. The advisor manager 260 may access one or more calendars accessible to provider computing device 110, advisor computing device 130, and/or third-party computing device 140 to determine the availability of one or more advisors. Computing devices with separately-maintained calendars may interface with each other using, e.g., any combination of one or more application programming interfaces (APIs), software development kits (SDKs or devkits), or other hardware/software mechanisms that facilitate data exchange or communication between and among co-located or remote computing systems with various access protocols.

A location monitor 265 may be configured to determine the location of, for example, consumers and advisors, as well as the locations associated with customer transactions (e.g., where a transaction took place). The location monitor 265 may be configured to track (using, e.g., one or more location sensors 235) the physical location of computing device 200. The location monitor 265 may be configured to identify the location of the computing device 200 at specified points in time or when triggered by identified events, such as the location of the consumer computing device 120 when a purchase occurs, when a device is turned on or off, when an application is launched, etc. The location of computing device 200 may be presumed to correspond with the location of one or more users associated with the computing device 200, and/or the location at which an event occurred. In different implementations, location may be determined without using location sensors 235. For example, location of computing device 200 may be determined by determining the location of a merchant at which a purchase occurred using a payment app running on computing device 200. Additionally or alternatively, location may be determined using other sensors, such as ambient sensors 240 used to detect sounds and videos that are recognized as indicative of a certain physical location of the computing device 200 (e.g., detection of spoken words or phrases from which location may be inferred, or detection of sounds from a public announcement system of a particular landmark such as a train station or airport). Also, a location of a first computing device may be determined based on (geographically-limited) communications (such as NFC, Bluetooth, Wi-Fi) of the first computing device with a (nearby) second computing device (such another user's smartphone, the router of a hotel or restaurant, etc.) for which location has already been determined or is known or presumed.

A chatbot 270 may be configured to simulate a conversation between a customer and advisor. Such a conversation may be conducted by, for example, capturing a customer's spoken words (or other communications), analyzing the communication to better understand context and identify user needs, and responding to the customer or otherwise providing information determined to be relevant. In some implementations, inputs (or a portion thereof) received via chatbot 270 may be fed to analytics engine 275 for analyses and formulation of responses. Alternatively or additionally, chatbot 270 may perform the analyses needed to formulate suitable responses to users. In certain implementations, certain analyses may be performed by chatbot 270 (e.g., determining what a user is asking and identifying when a financial issue has arisen), while other analyses (e.g., determining what recommendation would be suitable based on the financial issue and the user's circumstances, behaviors, etc.) may be performed via analytics engine 275.

The analytics engine 275 may be configured to enable artificial/machine intelligence capabilities by, for example, analyzing customer and advisor inputs (to, e.g., determine user goals and needs) and generating recommendations and proposals for presentation to the customer (to, e.g., achieve goals and/or satisfy needs). The analytics engine 275 may utilize, for example, artificial intelligence and machine learning tools to analyze customer conversations or other inputs and otherwise provide robo-advising without human intervention.

A transaction monitor 280 may be configured to identify and keep track of financial or other transactions of users. A customer may engage in transactions using, e.g., mobile payment and digital wallet services, or via any app and/or device through which a user may make purchases, transfers, deposits, cash advances, etc. The transaction monitor 280 may access such sources as user accounts (e.g., bank accounts, brokerage accounts, credit card accounts, merchant accounts, etc.) and payment/wallet applications to acquire data on transactions. A session manager 285 may be configured to initiate and terminate communications sessions between consumer computing devices 120 and advisor computing devices 130. Such advising sessions may incorporate one or more of audio, video, and text entries of users and advisors. In some implementations, advising sessions may be conducted via the same dashboard (e.g., from within the same application) through which the user is robo-advised. Advising sessions may begin at times scheduled via advisor manager 260, and/or on an ad-hoc basis. A profile manager 290 may generate and update user and advisor profiles (further discussed below), which facilitate robo-advising and human advising and help make transitions between the robo-advising and human advising smoother.

An external resource module 295 may be configured to access data from information sources other than the provider computing device 110 and the consumer computing device 120. In some implementations, the external resource module 295 may use, for example, any combination of one or more APIs, SDKs, or other hardware/software mechanisms that facilitate data exchange or communication between and among co-located or remote computing systems with various access protocols. Alternatively or additionally, the external resource module 295 may access publicly-available information sources. External resources may include financial product websites, merchant websites, and other sources of information on available products. In certain implementations, the external resource module 295 may access social networking websites for information on, for example, life events and familial or other relationships to understand (in an automated fashion) the needs, circumstances, and likely goals of a user (e.g., information on who might be affected by the financial decisions of a user, such the user's children). The external resource module 295 may similarly access other sources of information, such as credit agencies, news sources, financial institutions, governmental bodies, etc. Information from such sources may provide inputs to the analytics engine 275 to inform the robo-adviser in making recommendations as to, for example, financial goals and changes thereto. The information may also be made available to human advisors to assist with advising sessions.

Although the above discussion identifies a set of modules that perform specified functions, in various implementations, the above (and other) functions may be performed by any module in the system 100. Functions performed by the modules discussed above may be redistributed (i.e., differently apportioned or distributed) among the modules of applications running on provider computing devices 110, consumer computing devices 120, advisor computing devices 130, and/or third-party computing devices. Similarly, the functions discussed may be consolidated into fewer modules, or expanded such that they are performed by a greater number of (separate) modules than illustrated above. For example, functions performed by the above-identified modules of one or more provider computing devices 110 could additionally or alternatively be performed by modules of one or more consumer computing devices 120, and functions performed by the above-identified modules of one or more consumer computing devices 120 could additionally or alternatively be performed by modules of one or more provider computing devices 110.

Figure 3:
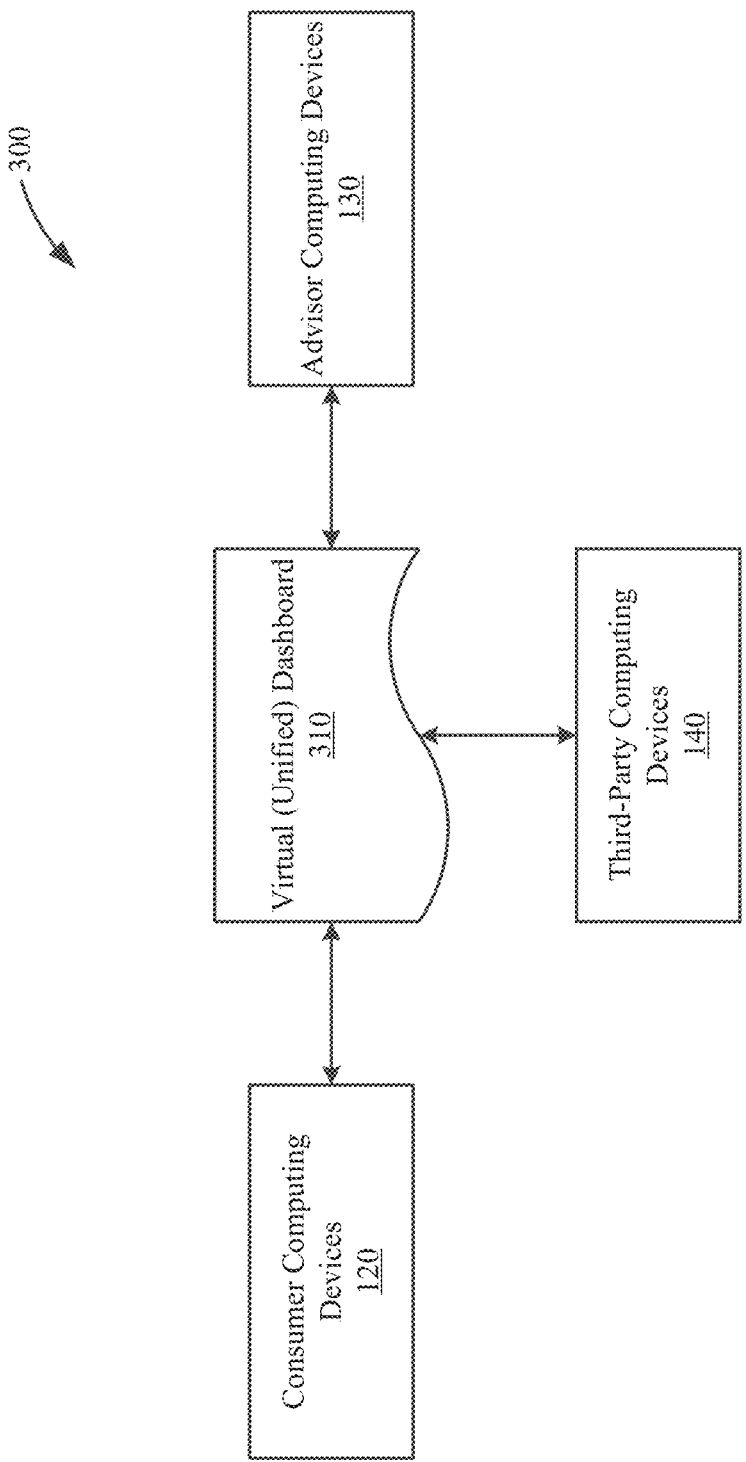
FIG. 3 depicts an implementation of an example pervasive advising system with a virtual dashboard according to example embodiments.

Referring to FIG. 3, in example implementations, a system 300 may include a virtual dashboard 310 (see, e.g., FIGS. 8-17 discussed below) that is accessible to one or more consumer computing devices 120 and one or more advisor computing devices 130. The dashboard 310, which may be maintained and/or administered using one or more provider computing devices 110 of a service provider, may be "unified" in the sense that it allows consumer computing devices 120 and advisor computing devices 130 to effectively exchange information in the same virtual environment. Because customers and advisors may interact with each other via, for example, user interfaces with common elements, and both users and advisors may be able to readily access at least some (if not all) of the same information and user interface elements, advisors may more easily learn of a customer's circumstances (goals, needs, etc.) via dashboard 310. This may help save consumers and advisors from needing to devote a substantial amount of resources (time, computing resources, etc.) to bring an advisor "up to speed." Users need not spend time explaining their unique situations by sharing details that have already been entered or otherwise provided by the user or acquired from various information sources (such as third-party computing devices 140). A common dashboard helps discussions by allowing customers and advisors to refer to the same user interface elements. Moreover, familiarity with the dashboard allows the customer and advisor to more readily access and provide information that is relevant to different topics being discussed or otherwise addressed. The unified dashboard 310 may help provide for smoother transitions between robo-advising and human advising.

In certain implementations, the provider computing system 110 may maintain a user profile (further discussed below) that may include relevant financial information, user preferences, triggers for transitioning between robo-advising and human advising, and other data. The provider computing system 110 may use user profiles to assist with the implementation of dashboard 310. Consumer computing devices 120 can be provided access to the dashboard 310 to receive recommendations, review conversations, enter additional information, monitor progress towards goals, request and schedule human advising sessions, etc. Advisor computing devices 130 may be used to access consumer data, schedule advising sessions with consumers, provide additional recommendations, monitor and update goals, etc. The user profile may include parameters for what information is accessible, when transitions are advisable, etc., further helping make transitions smoother.

Figure 4:
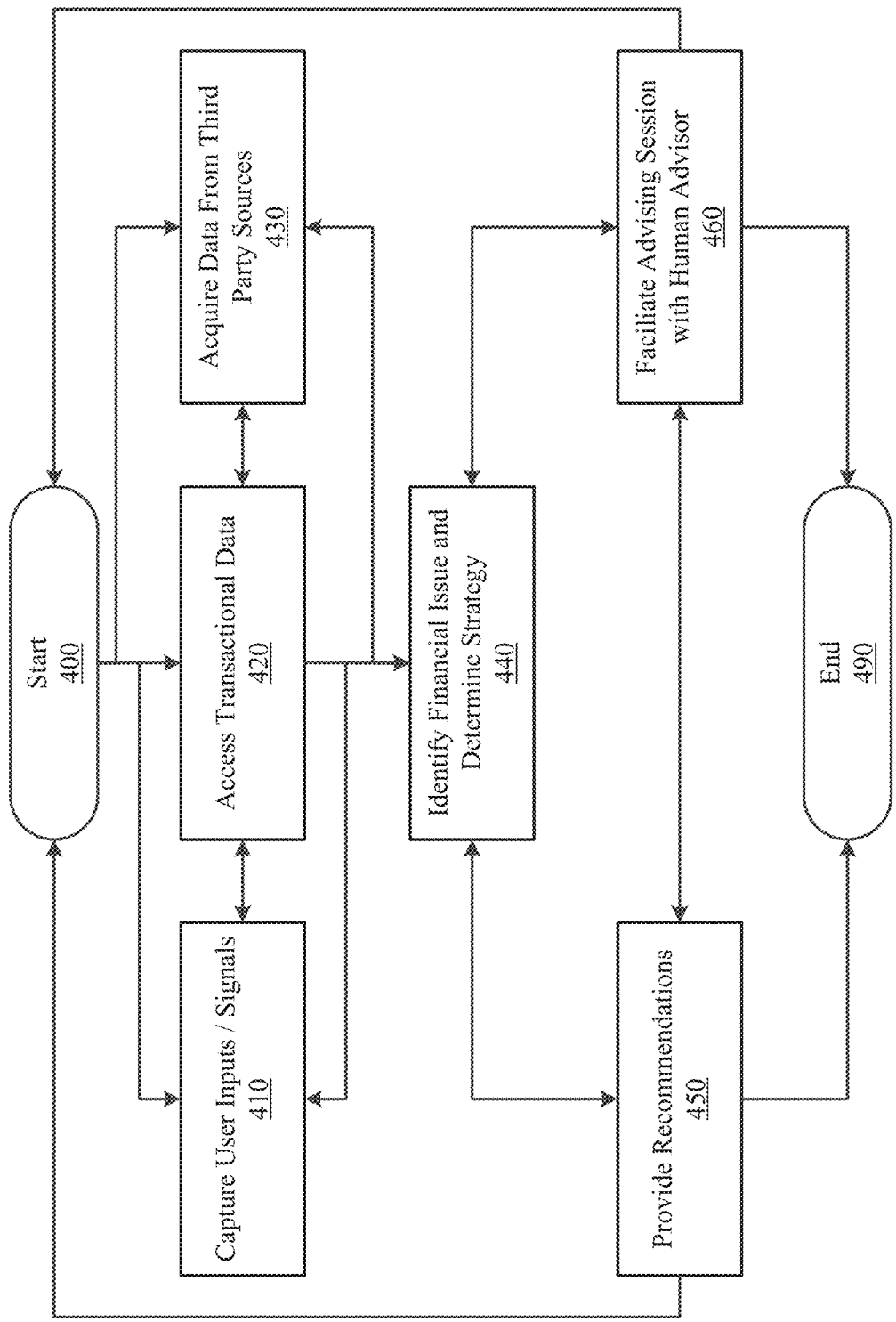
FIG. 4 depicts an example method of advising a user according to example embodiments.

Referring to FIG. 4, various versions of example process 400 may be implemented using, for example, a provider computing device 110, a consumer computing device 120, and an advisor computing device 130. At 410, one or more computing devices 200 (e.g., consumer computing devices 120 and/or, in some implementations, provider computing device 110) may be used to capture user inputs. User inputs may include conversations (e.g., spoken conversations or discussions in electronic messages) captured via computing devices 200, entries submitted via application 250, or any other transfer or exchange of data from the user to the computing device 200. For example, application 250 running on consumer computing device 120 may detect (using microphones of one or more consumer computing devices 120) that a customer is discussing a financial matter. In some implementations, a provider computing device 110 may receive audio of a conversation from a consumer computing device 120 for analysis, and/or a consumer computing device 120 may itself analyze audio of conversations. In certain implementations, particular keywords or phrases may be deemed to indicate a potential financial goal or need. Examples include: "my mother had a bad fall . . . I need to manage her finances"; "my credit score is really low . . . . I need to work on improving my credit score."; "I would like to buy a car"; "I would like to go on a vacation/I need a vacation"; "Honey, we should save some money . . . We should have more of a cushion in our finances in case we have unexpected expenses"; "We're having a baby, we need to start saving for college"; etc.

Additionally or alternatively, at 420, one or more computing devices 200 may access records on financial or other transactions of the user to identify transactions indicative of a user need or goal (such as baby supply purchases indicative of a potential goal or need to save for educational expenses). In some implementations, such transactions may be detected via, for example, application 250 running on, for example, a consumer computing device 120, such as mobile wallet or electronic payment application. In various implementations, such transactions may be identified by, for example, a consumer computing device 120 accessing user records maintained at or administered by a provider computing device 110 (e.g., for accounts held at a provider that is a financial institution) and/or accessing a third party computing device 140. In some implementations, such transactions may be identified by a provider computing device 110 accessing a consumer computing device 120 and/or a third party computing device 140.

At 430, one or more computing devices (e.g., provider computing device 110 and/or consumer computing device 120) may retrieve data from third party computing devices 140 that may be informative of a user's circumstances. For example, accessing a customer's credit report may indicate that a customer may need assistance with improving his or her credit score. Similarly, application 250 (running on, e.g., a provider computing device 110 and/or a consumer computing device 120) may access social networking applications to identify family members, life events, travel plans, etc. A determination as to which third party data sources to access may be based at least in part on user inputs and/or transactional data. For example, application 250 may detect a conversation about an upcoming trip without an identification of the destination, or about an upcoming move to a college dorm without an identification of the college or dorm, and in response a provider computing device 110 may determine that accessing a third party computing device 140 of a social networking source, a college directory, a ticket purchase identified via travel sites, etc., may help identify the destination, college, and/or dorm.

At 440, the user inputs, transactional data, and/or third party data may be analyzed by one or more computing devices 200 (e.g., via analytics engine 275 of application 250 running on a provider computing device 110 and/or on a consumer computing device 120) to identify one or more financial issues. For example, based on user inputs acquired via a consumer computing device 120, a provider computing device 110 may determine that a consumer could benefit from a financial product or a certain course of action. In response, at 450, the provider computing device 110 may present, via an application 250 running on a consumer computing device 120, a recommendation. The recommendation may be, for example, to set up an account (e.g., a bank or credit account), divert money into one or more accounts for savings, subscribe to a service, etc. If it is determined that the financial issue warrants review or intervention by a human advisor, the recommendation of provider computing device 110 (presented via, e.g., application 250 running on a consumer computing device 120) may be to engage with a human advisor (e.g., an advisor generally, an advisor by specialty or expertise, and/or an advisor by name). The advisor manager 260 running on, for example, a provider computing device 110 and/or a consumer computing device 120 may then help the consumer computing device 120 find and connect with one or more advisor computing devices 130.

If a customer wishes to proceed with human advising, computing device 200 (e.g., provider computing device 110 and/or consumer computing device 120) may, at 460, facilitate an advising session with a human advisor. This may include identifying potential advisors suitable for the financial issues relevant to the customer's situation (by, e.g., the provider computing device 110 and/or consumer computing device 120 accessing advisor biographies stored at one or more provider computing devices 110, advisor computing devices 130, and/or a third party computing devices 140). In some implementations, facilitating an advising session with a human advisor may include the computing device 200

(e.g., a provider computing device 110) arranging a time for the customer to have a discussion with an advisor by accessing calendars on one or more consumer computing devices 120 and advisor computing devices 130, and proposing one or more times during which the customer and the advisor are both available. The provider computing device 110 may then instruct the consumer computing device 120 and/or advisor computing device 130 to update the calendars that are able to be accessed and changed via the consumer computing device 120 and/or the advisor computing device 130. In some implementations, the calendar is additionally or alternatively maintained on dashboard 310, which may be linked to other calendars accessible to consumer computing device 120 and/or advisor computing device 130.

In some implementations, a provider computing device 110 may, from within dashboard 310, connect a consumer computing device 120 with an advisor computing device 130. This may be accomplished by enabling video chat, audio chat, text chat, or other live interaction sessions. In certain implementations, the provider computing device 110 may monitor the communications (e.g., by listening to spoken words) or other data exchanged during live interactive sessions between customers and advisors to update customer goals and needs for subsequent use. Monitoring such data can enable the robo-advisor to seamlessly take over from advisor computing device 130 when the human advising session is concluded and advise or otherwise assist the customer (until human intervention is needed at a future time). In other implementations, provider computing device 110 does not facilitate a live session between the consumer computing device 120 and the advisor computing device 130, and instead subsequently updates a user profile using data obtained via other channels after the session has concluded. Such data may be obtained by, for example, capturing user inputs (410) (e.g., by listening to a conversation about the session between the customer and another person), accessing transactional data (420), and/or acquiring data from third party source (430).

Figure 5:
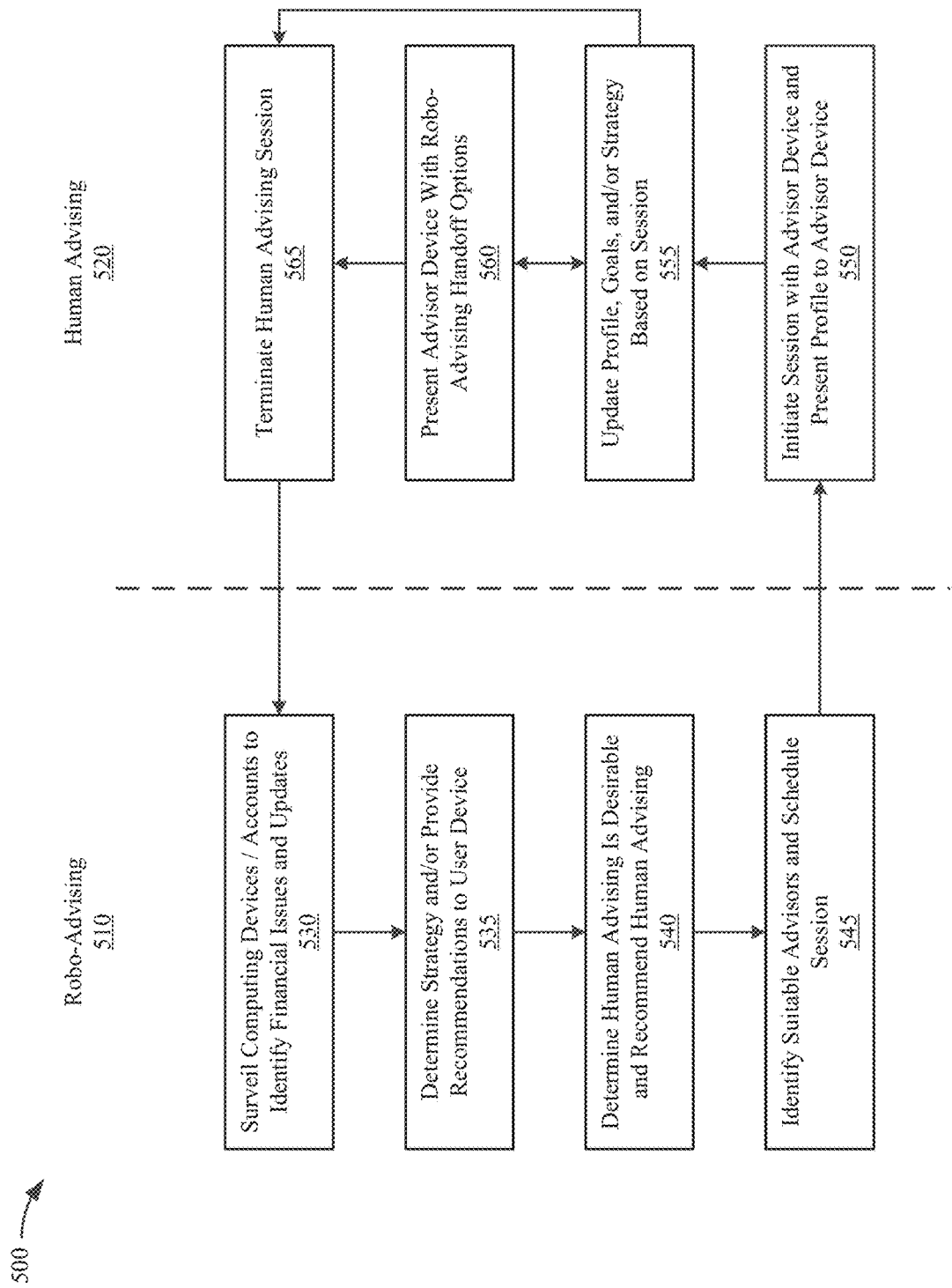
FIG. 5 depicts an example method for transitioning between robo-advising and human advising according to example embodiments.

Referring to FIG. 5, an example process 500 for transitioning between robo-advising mode 510 (on left side) and human advising mode 520 (on right side) is depicted. At 530, provider computing device 110 surveils consumer computing devices 120 and third party computing devices 140 to identify financial issues and changes in/updates to a customer's circumstances. As discussed above, this may be accomplished, for example, via channels that allow for monitoring of communications (e.g., by detecting conversations via a chat bot and/or scanning electronic messages to extract relevant data). Based on the data acquired via such surveillance, at 535, provider computing device 110 and/or consumer computing device 120 may determine a strategy and present (via, e.g., application 250 running on the consumer computing device 120) one or more recommendations. Based on inputs (e.g., one or more "go-human" triggers), at 540, the provider computing device 110 and/or consumer computing device 120 may determine that human advising is desirable and recommend a session with a human advisor. At 545, the provider computing device 110 and/or the consumer computing device 120 may then identify suitable advisors and schedule a communications session with an advisor computing device 130.

The provider computing device 110 may then, at 550, initiate a live communications session (e.g., with video, audio, and/or text chatting) between the consumer computing device 120 and the advisor computing device 130. Based on the communications between the consumer computing device 120 and the advisor computing device 130, provider computing device 110 may, at 555, update or otherwise revise the profile, financial goals, and strategies of the customer (stored at, e.g., the provider computing device 110, the consumer computing device 120, the advisor computing device 130, and/or the third party computing device 140). At 565, the provider computing device 110 may then, in response to a command from the consumer computing device 120 and/or from the advisor computing device 130) terminate the live human advising session and return the customer to robo-advising mode 510.

In some situations, the customer may receive the help that warranted a human advisor, but the human advising session is not terminated (because, e.g., topics to be discussed were added during a session, because the topics of discussion were too broad to begin with, etc.). The advisor may then be spending time with a customer in human advising 520 even though the customer could be served just as well via robo-advising 510. The provider computing device 110 and/or advisor computing device 130 may, in some implementations, monitor the communications between the user computing device 120 and the advisor computing device 130 for "back to bot" triggers, or to otherwise determine when the human advisor may no longer be needed, or when the customer has reached a point at which the provider computing device 110 may be able to assist the customer using automated tools. The provider computing device 110 and/or advisor computing device 130 may (via, e.g., dashboard 310) present a virtual button, link, "pop up" notification or other message, etc. (see, e.g., FIG. 11), to inform the advisor that one or more matters suspected to be addressable via robo-advising have been identified and/or to otherwise allow the advisor to initiate a "handoff" back to the robo-advisor. In some implementations, such a selection terminates the human advising session. In other implementations, such a selection additionally or alternatively sends a message to consumer computing device 120 with an option to terminate the advising session and/or a list of one or more topics or selections for issues to address (e.g., enter requested information on financial accounts, income, bills, etc.) outside of the communications session (e.g., in an automated fashion).

Advantageously, this can enhance efficiency and save the time of both the advisor and the consumer by using the type of interaction (robo versus human) suited to the stage of advising or the particular issues to be addressed. For example, having a human advisor waiting while the provider computing device 110 and/or the consumer computing device 120 collects information (e.g., account numbers, etc.) may not be an ideal use of the advisor's time. Similarly, having a customer waiting as the advisor computing device 130 retrieves information on a set of available options when the set can be generated by the robo-advisor (potentially more quickly) may not be an ideal use of the customer's time.

Figure 6:
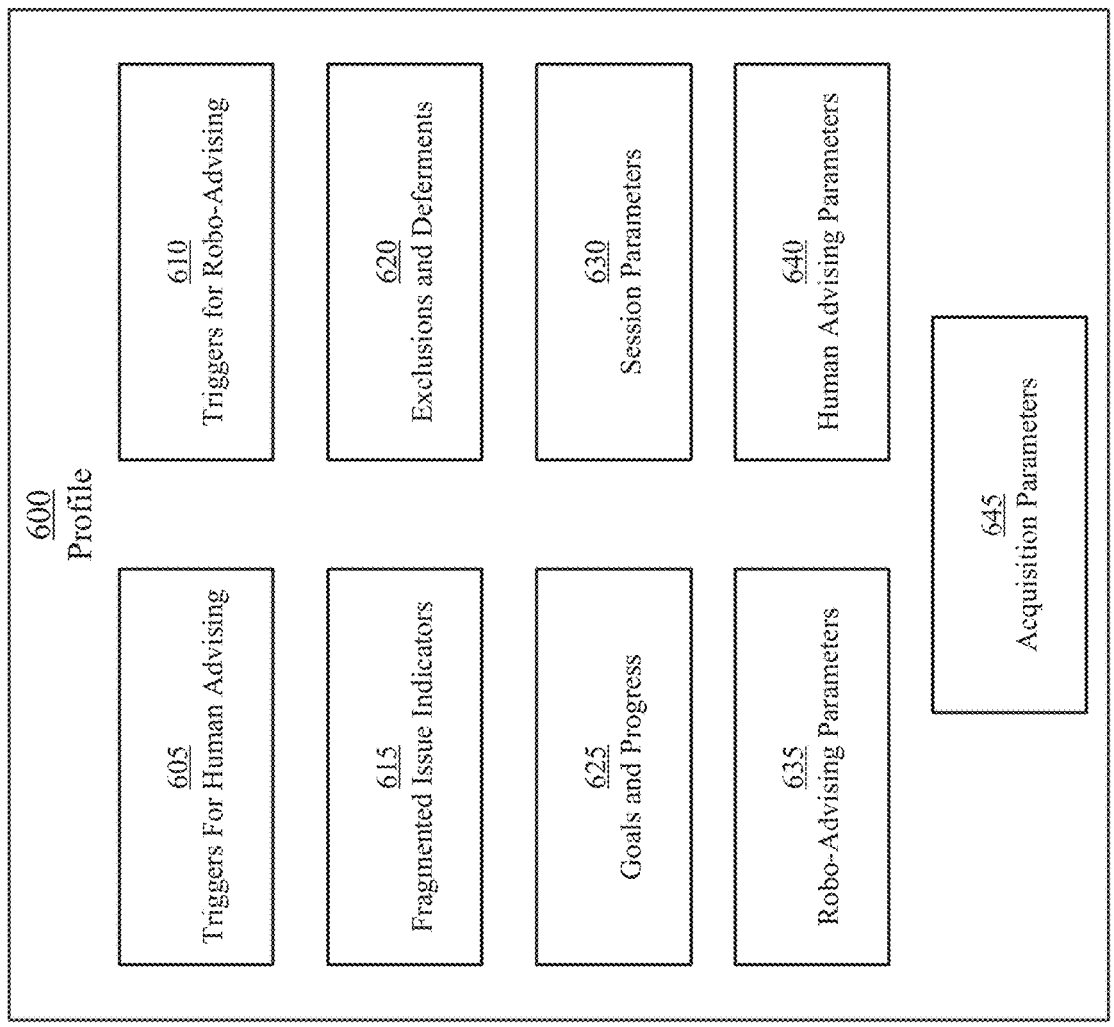
FIG. 6 depicts an example profile applicable to advising of one or more users according to example embodiments.

Referring to FIG. 6, illustrated is an example profile 600 that may, in certain implementations, be generated and/or maintained by provider computing devices 110 for use by provider computing devices 110, consumer computing devices 120, and/or advisor computing devices 130. This profile may be saved in memory as database records, data packets, text files, or in other suitable formats.

As discussed above, a transition module 255 may determine that it is appropriate to transition a user computing device 120 from robo-advising to human advising to better assist a customer. To facilitate such determinations, profile 600 may include go-human triggers 605 (discussed above) to assist with the identification of a situation in which a human advisor may be suitable. Go-human triggers 605 may, for example, be unique to the specific customer based on past behaviors (e.g., if a customer has sought human assistance when a certain issue arises, the issue/behavior may indicate a go-human trigger 605). Triggers 605 may also include customer inaction in response to certain life events and/or in response to certain recommendations in situations (which may be unique to a customer) deemed to be significant enough to warrant action sooner rather than later (based on, e.g., certain detected inputs).

Similarly, the transition module 255 may determine a return to robo-advising may be appropriate based on back-to-bot triggers 610 (discussed above). Back-to-bot triggers 610 may be based on, for example, certain behaviors of the customer. For example, if a customer is detected to routinely (and in a sufficiently timely manner) handle certain financial situations without advising sessions with advisor computing devices 130, then identification of the financial situation may be a back-to-bot trigger that indicates it may be suitable to allow the customer to continue on a robo-advising track or otherwise without human discussion for the time being. Back-to-bot triggers may alternatively or additionally be based on a customer's savviness, expertise, or familiarity with certain situations. For example, if a customer is determined to be sophisticated with respect to certain financial situations, then identification of the corresponding financial situations may indicate that robo-advising may be suitable. In some implementations, a customer's savviness or ability to handle a situation may be determined, for example, via an evaluation (e.g., using analytics engine 275 running on provider computing device 110, consumer computing device 120, and/or advisor computing device 130) of the customer's sophistication with respect to certain issues. Sophistication may be based on, for example, how advanced the language used by the customer is with respect to an issue. For example, a customer who is detected to discuss available options with respect to a certain financial situation with a family member (and/or a member of an authentication circle to which the customer belongs) may be deemed more sophisticated than a customer who is detected only to discuss the circumstances of the financial situation with no talk of viable options for how the customer may proceed. Sophistication (in general or specific to financial issues/situations) may be stored in one or more fields of profile 600 to help with advising generally and to help make transitions between robo-advising and human advising more effective.

In certain implementations, fragmented issue indicators 615 may be used to allow provider computing device 110 and/or user computing device 120 to track and connect inputs over time (as being related or otherwise as building upon each other to form a better picture of circumstances or otherwise better inform advising). In some situations, a person's needs or goals do not become apparent in one conversation, statement, communication, transaction, or other act. For example, the keywords and/or phrases that indicate a user has a certain need or goal may not be detected as part of a single conversation or otherwise within a short period of time. Needs or goals may unravel over time (hours, days, weeks, months, etc.) as a consumer obtains more information and/or contemplates his or her situation based on new events and available information. And the bases for such goals and needs may go unexpressed or otherwise remain unapparent for some time.

For example, a consumer device 120 may detect a customer explaining to a friend that his or her mother had a bad fall, and may detect, in a separate conversation with his or her sibling, the customer explaining "I need to manage her finances." Separately, these inputs may be insufficient to identify a financial goal or need and make a good recommendation. However, when considered together, these two inputs may be deemed (by, e.g., analytics engine 275) to indicate that a user may need certain financial assistance or have a certain financial goal. The consumer computing device 120 (and/or the provider computing device 110 using audio or other data received via consumer computing devices 120) may (based on, e.g., detected keywords, phrases, or other signals) determine that a piece of information may potentially be relevant to whether a financial goal or need exists. If such a signal is detected, the provider computing device 110 and/or user computing device 120 may record such a signal as a fragmented issue indicator 615. Then, when a second signal that is similarly determined to include a piece of information that is potentially relevant to some financial issue is detected, the provider computing device 110 and/or consumer computing device 120 may access profile 600 for fragmented issue indicators 615 that may be relevant. If such a related fragmented issue indicator 615 is in the user's profile 600, the robo-advisor (via, e.g., the provider computing device 110 and/or the consumer computing device 120) may determine that there is a likely need, and generate an appropriate recommendation, or determine that more information (e.g., additional signals or inputs) is needed to generate a relevant or useful recommendation.

In the above example, the consumer computing device 120 and/or provider computing device 110 may identify a first signal when a phrase such as "my mother had a bad fall last night" is detected. In some implementations, application 250 may first process the signal to give the signal more meaning or clarity and/or to supplement the signal with additional information. For example, analytics engine 275 running on provider computing device 110 may analyze the phrase and retrieve information from various sources to determine who was involved (e.g., who is the speaker's mother based on user records or third party sources), on what date the fall occurred (e.g., what is the date of the day before the day on which the signal was detected), what can be predicted about the fall in the context of the conversation (e.g., if the speaker's voice indicated that the speaker was upset, the fall may be deemed to have been more serious or more recent than if the speaker's voice indicated the speaker was apparently nonchalant about the incident), what a "bad" fall might mean for a person of the mother's age or other known or determinable circumstances (e.g., the mother's age or whether such falls have occurred in the past), etc. Such information may be in the user's record or determinable from third party sources (e.g., from sources of medical information), and the fall may be deemed more serious based on certain criteria (such as the mother's age being above a certain age threshold, or the mother suffering from certain conditions associated with low bone density, etc.). In various implementations, signals (detected via, e.g., provider computing device 110 and/or consumer computing device 120) need not be limited to expressions (e.g., spoken conversations, written discussions, or other communications). Additionally, signals may be actions taken (using, e.g., consumer computing device 120), such as opening certain accounts, making certain funds transfers, making certain purchases, and/or traveling to certain locations (such as car dealerships, open houses, baby supply stores, assisted living homes, hospitals in general, specific clinics or doctors' offices with certain specialties, accountants' offices), etc.

The provider computing device 110 and/or consumer computing device 120 may record a fragmented issue indicator 615 following the first signal in the profile 600. In various implementations, fragmented issue indicator 615 may state, for example, a derivation of the communicated phrase (e.g., "family member had an accident," "user's mother had a fall," etc.), the phrase itself (i.e., "my mother had a bad fall last night"), or a supplemented or otherwise revised version of the phrase (e.g., "my mother had a bad fall [on mm/dd/yyyy]," "[user name's] 'mother had a bad fall' on mm/dd/yyyy," or "[mother's name] 'had a bad fall' on mm/dd/yyyy").

Where the fragmented issue indicator 615 arises from detection of a location of the consumer computing device 120, the fragmented issue indicator 615 may include an identification of the location visited, such as "customer visited open houses at [home 1] and [home 2]" or "customer visited assisted living home [at address]." In some implementations, the identification of the location may be accompanied by an indication of the amount of time spent at the location, such as "customer spent [amount of time] at an assisted living home." In certain implementations, a visit to a location may not be deemed significant enough to warrant recording a fragmented issue indicator unless the consumer computing device 120 was detected to have remained at the location for a certain minimum amount of time. For example, a fragmented issue indicator 615 may not be triggered unless the consumer computing device 120 was detected to have remained at a relevant location a minimum of 10 minutes. In some implementations, an analytics engine 275 may decide whether to include a fragmented issue indicator 615 in profile 600 by balancing the likely relevance of a statement or a location visited, the amount of time spent at the location, and/or the likely impact on advising or needs and goals of the customer.

In some versions, fragmented issue indicators 615 may be saved as a compilation of, or otherwise associated with, multiple fields. For example, there may be a "subject" or "primary" field that may be populated with a phrase or derivations thereof, identification of certain actions, or other signals. Additional example fields include: time and/or date an input was captured and/or added to profile 600; which computing device was used to capture an input; identity of a user associated with the computing device used to capture an input; location of the computing device used to capture an input; identify of the speaker or source of the input; etc. In some implementations, these may be used to give meaning to fragmented issue indicators 615 or combinations thereof.

In some implementations, a user's profile 600 includes fragmented issue indicators 615 associated with multiple users. The names of other users (e.g., family members, confidants, etc.) with whom a user is associated (such as by being in an authentication circle) may be included in profile 600 (e.g., in goals and progress 625), and fragmented issue indicators 615 may be stored in multiple profiles 600 such that any single profile 600 may include the fragmented issue indicators 615 of all associated users. For example, a first user's profile 600 may include fragmented issue indicators 615 of a second user (and vice versa) who is a family member, friend, or otherwise associated with the first user (e.g., via an authentication circle). Signals acquired from multiple individuals (stored in one or more profiles 600) may then be used by, for example, provider computing device 110 and/or consumer computing device 120 to generate recommendations.

As an illustrative example, a first signal may be based on a first input resulting from a first user (e.g., an adult child) saying "I need to manage her finances." A second signal may be based on a second input from a second user (e.g., a parent of the adult child) saying "I had a bad fall." A third signal may be based on detection of the consumer computing device 120 being located at an assisted living home for more than 30 minutes. These three inputs may be used to generate three fragmented issue indicators 615 that, together, identify a financial goal of a person wishing to manage another's finances based on the other's needs. Advantageously, inputs related to one user's circumstances, goals, needs, etc., may be more accurately and/or quickly identified by acquiring and considering inputs from multiple user computing devices 200 associated with multiple other users (who may communicate about each other even if not directly speaking or otherwise communicating with each other). The fragmented issue indicator 615 (as well as any of the other parameters in profile 600) may also include an access permissions field that identifies which fields (if any) of the fragmented issue indicator 615 (or other parameter corresponding to the access field) are accessible to particular advisors or other users.

In some implementations, a recommendation from the robo-advisor may be based on one or more fragmented issue indicators 615. Additionally or alternatively, the provider computing device 110 and/or user computing device 120 may await a second (or third, fourth, etc.) signal that is relevant to the first signal (or one or more prior signals if more than one) and allows for a more informed or more targeted recommendation. Continuing with the above example, if the user computing device 120 detects "I need to manage her finances," application 250 may determine there is a potential financial issue (based on, e.g., keywords such as "manage" and "finances") but may also determine that more information is desirable for formulating a suitable recommendation. Such information may, in some implementations, be acquired via dialogue with the customer (e.g., an inquiry, conversation, or other information exchange). For example, chatbot 270 of application 250 (running on, e.g., a consumer computing device 120) may speak with the customer to ask general questions (e.g., inquiring whether the customer would like assistance with a financial issue, followed by more specific questions) and/or specific questions (e.g., inquiring whether the customer would like to manage all finances or only finances related to certain expenditures, such as health care).

In certain implementations, when the second third, or other signal is detected, the provider computing device 110 and/or user computing device 120 may access the fragmented issue indicators 615 for related information. Based on, for example, one or more signals (related to the mother's fall), application 250 may predict that the person who is to have her finances managed (corresponding to the term "her" in a statement) is the mother's, and the reason for the management of finances might be a "bad fall." The robo-advisor (via, e.g., provider computing device 110 and/or user computing device 120) may then be more informed about subsequent signals (e.g., that the fall will be subsequently discussed and additional details can be extracted from those subsequent conversations), provide more informed recommendations, or ask more informed questions as part of a dialogue with the customer. Alternatively or additionally, the second signal may be recorded as another fragmented issue indicator 615 for subsequent use (e.g., in combination with a third signal detected subsequently).

In some implementations, the fragmented issue indicators 615 may be made available to an advisor computing device 130 prior to or during a human advising session. Such fragmented issue indicators 615, or certain fields therein, may be recorded using, for example, "plain" text or other format that is readily interpretable by a financial advisor to help make the transition from robo-advisor to human advisor more efficient by helping the advisor more quickly understand the customer's circumstances (and consequent needs and goals). In some implementations, the user profile 600 may record encoded versions of the signals as fragmented issue indicators 615, and the decoding scheme may be made accessible to specified advisor computing devices 130 or other devices to help control what information is shared (to save time that might otherwise be spent reviewing information that is not particularly relevant to a topic to be discussed during an advising session, to better maintain confidentiality of certain information, etc.).

This approach assists with implementation of pervasive advising, as a more complete picture can be formed even though computing devices 200 may only detect or acquire part of the picture (e.g., aspects of a customer's circumstances) in a given time period. Multiple segments of a discussion, user entries, etc., in multiple contexts, may be needed or desired to enhance understanding of relevant financial issues and thus enhance the likely value and relevance of resulting recommendations. Advantageously, user computing devices 120 being used to detect conversations may not always detect a conversation in its entirety, or even if a whole conversation is detected, not all of the words and meanings may have been understood. For example, if the user computing device 120 detecting a conversation is a smartphone, and the smartphone is placed in a pocket or bag during a conversation, the voices may become muffled, and the portion of the conversation during which the smartphone is in the pocket or bag may be missed. Similarly, if the user computing device 120 is a smart speaker in one room, and one or more speakers move out of the room or otherwise out of the range of the smart speaker, portions of the conversation may be missed. By combining fragmented issue indicators 615, a customer's needs can be evaluated and identified over time as additional user inputs are detected.

Example profiles 600 may also include one or more fields related to exclusions and deferments 620. These fields may indicate, for example, that a customer does desire or need assistance with certain matters (exclusion of a matter), or may not desire or need assistance for a certain specified time period (deferment of matters). In some implementations, application 250 may refer to exclusions and deferments 620 before a recommendation is formulated or given. For example, conversationalists (via spoken words, written communications, etc.) may make certain statements in certain contexts that are not, taken in isolation, valuable predictors of a user's goals or needs. For example, a speaker may make a statement with a friend for the purpose of making a point, in jest, sarcastically, to be agreeable, and/or to spare feelings. In a hypothetical, if a friend informs a customer that the friend has not done nearly enough to save for the friend's child's education, and, so as to be agreeable, the customer states that the customer has similarly not done nearly enough, the customer does not necessarily need help with the financial goal of saving for the customer's child's education. The customer may not be prioritizing the particular goal, or may have already established the goal and be making progress towards it (as can be confirmed by application 250 accessing the customer's accounts, prior advising sessions, other communications, etc.), consequently, the customer may not need to immediately address or revisit the issue. In some implementations, such a statement may be deemed to warrant an entry in exclusions and deferments 620 of the customer's profile to help limit or avoid recommendations on certain topics. Similarly, an exclusion and deferment 620 may be generated in response to a specific instruction or statement of a customer (e.g., a customer stating to a consumer computing device 120 directly or making a statement to another person such as "I do not want to be advised on this topic" or "that's not a priority of mine right now, I will deal with that next month/year"). In some implementations, the information on particular topics may still be saved to help form a better picture of a customer's circumstances, but recommendations may be modified to avoid or delay certain topics.

Alternatively or additionally, certain statements may be analyzed to generate entries in goals and progress 625 of profile 600. For example, continuing with the above example, the customer saying that he or she also has not done nearly enough to save for college may indicate that, for example, the customer has one or more children (if not already known or determined in another way), that the customer may be considering college savings (especially if the customer has not already been advised on this topic), and/or that the customer may deem college savings a priority or otherwise a relevant consideration in making financial decisions in the future. Such information, recorded in profile 600, may then be used by the robo-advisor, and/or presented to an advisor, to better inform recommendations and proposals.

Profile 600 may also include one or more session parameters 630. Application 250 (via, e.g., consumer computing device 120) may accept session parameters 630 (via, e.g., dashboard 310) to determine how a human advising session should be conducted. For example, a customer may wish to have audio only, text only, or video chat. The session parameters may be used by provider computing device 110, user computing device 120, and/or advisor computing device 130 to provide the customer with human advising sessions that meet the customer's needs.

Additionally, a customer may only wish to receive automated recommendations in specified ways, something that can be indicated in robo-advising parameters 635 of profile 600. In some implementations, the consumer computing device 120 may be programmed to only speak or otherwise make inquiries and provide recommendations under certain conditions but not under other conditions based on robo-advising parameters 635. For example, if a user is speaking with a casual friend, it may not be appropriate to converse with the user to inquire as to whether the user wishes to pursue a specified (personal/confidential) financial goal that is identified based on the conversation with the casual friend. Rather, the user may wish to receive recommendations when the user is alone, at home, with close family or friends only, during certain times and days (e.g., not during work hours, or not after dinner when the user may be winding down for sleep and not wishing to consider financial issues, or not on Sundays), and via certain channels and formats. In some implementations, robo-advising parameters 635 may, for example, prohibit a smart speaker or other consumer computing device 120 from disrupting the customer or discussing confidential topics at inappropriate times.

Profile 600 may also include human advising parameters 640. In some implementations, human advising parameters 640 may indicate that a customer wishes only to receive high-level advice on overall goals from human advisors (e.g., to discuss the "big picture"). Similarly, the human advising parameters 640 may indicate that the customer is additionally or alternatively interested in more specific advice on implementing particular goals or executing on action plans. In certain implementations, the fields/values of human advising parameters 640 may be used by provider computing device 110 and/or customer computing device 120 when matching a customer with a suitable human advisor.

Profile 600 may additionally or alternatively include one or more acquisition parameters 645. In one or more fields, acquisition parameters 645 may specify how the customer is to be surveilled (e.g., what inputs may be acquired, how various inputs are captured, etc.) and when/where the customer is not to be surveilled. In some implementations, acquisition parameter 645 may indicate which consumer computing devices 120 may be used to detect conversations. For example, a customer may wish to include/exclude detection of conversations via identified smartphones, smart speakers, smart watches, laptops, etc., to control in what circumstances the customer's words may be taken into consideration (e.g., should or should not be used as a source of data for advising purposes). Consumer computing devices 120 may be identified by, for example, device identification numbers and/or associated users. In various implementations, acquisition parameter 645 may, alternatively or additionally, identify certain locations (as determined using, e.g., location sensor 235) which are "off limits" and conversations should not be surveilled. For example, a customer may identify a doctor's office as a location, and in response to detection that the consumer computing device 120 is located in, or has moved into, the identified location, the consumer computing device 120 may cease detection of conversations for use in advising the customer. This would allow the customer to exclude certain private conversations (with, e.g., a therapist) from consideration in advising. In some implementations, acquisition parameters 645 may be used to indicate that conversations with certain persons are included/excluded as advising inputs, and/or certain modes of communication are included/excluded as advising inputs. With such acquisition parameters 645, a consumer computing device 120 may, for example, not continue detecting a conversation in response to identification of a specified speaker (by, e.g., recognizing a voice signature, detecting the person's name used in a greeting, etc.), and/or may include exclude certain electronic messages (e.g., text messages and/or e-mails) received from specified applications and/or communication channels from being analyzed for inputs relevant to advising of the customer.

Parameters and fields corresponding to profile 600 identified in FIG. 6 help both the robo-advisor and the human advisor provide more relevant recommendations in a personalized fashion, while more quickly focusing on the topics on which a customer wishes to receive assistance. They also help customers more seamlessly transition between robo-advising and human advising, allowing the more efficient form of advising to be used based on customers' circumstances.

Figure 8:
FIG. 8 depicts an example graphical user interface of a potential virtual dashboard according to example embodiments.
Figure 8:

Referring to FIG. 8, an example graphical user interface of, for example, a potential dashboard 310 is illustrated. The user interface, which may be viewable via consumer computing device 120 and/or advisor computing device 130, simultaneously or at different times, provides information on financial goals. The issues may have been identified and refined via robo-advising, human advising, or both. Also identified in the example user interface are accounts held by, or otherwise accessible to or viewable by, the customer. These accounts may be used in the fulfilment of financial goals, such as by having provider computing device 110 and/or customer computing device 120 transfer funds to/from such accounts or control spending by using credit accounts with particular limits, for certain expenses, etc.

The user interface may also identify advisors which whom the customer has conferred. In various implementations (not shown in FIG. 8), the interface may also identify, for example, the topics discussed with each advisor, the availability of each advisor, or the recommendations of each advisor. Also identified in FIG. 8 are the family members of the customer. Alternatively or additionally, members of one or more authentication circles (which does not necessarily require a familial relationship) to which the customer belongs may be identified. If authorization is obtained from the family members, even if they are not customers or otherwise being separately advised, conversations or other inputs of the family members may be used to better understand the goals and needs of the customer and thereby enhance the quality of recommendations and transitions between robo-advising and human advising. In some implementations, only conversations of (selectable) members of one or more (selectable) authentication circles may be used, as those members are deemed to be stakeholders with respect to one or more issues. Some or all of the information in dashboard 310 may be stored or identified in profile 600. For example, fragmented issue indicators 615 for all of the known family members/authentication circle members may be included in profile 600.

In various implementations, any of the icons or screen elements in the figures can be structured to be clickable or otherwise selectable (using any input mechanism, such as a touchscreen, mouse, voice prompt, gesture, etc.) for accessing additional information (such as details about an advisor, account, goal, etc.) for initiating joint or separate communications (with, e.g., one of the advisors, family members, and/or members of one or more authentication circles), etc.

Figure 9:
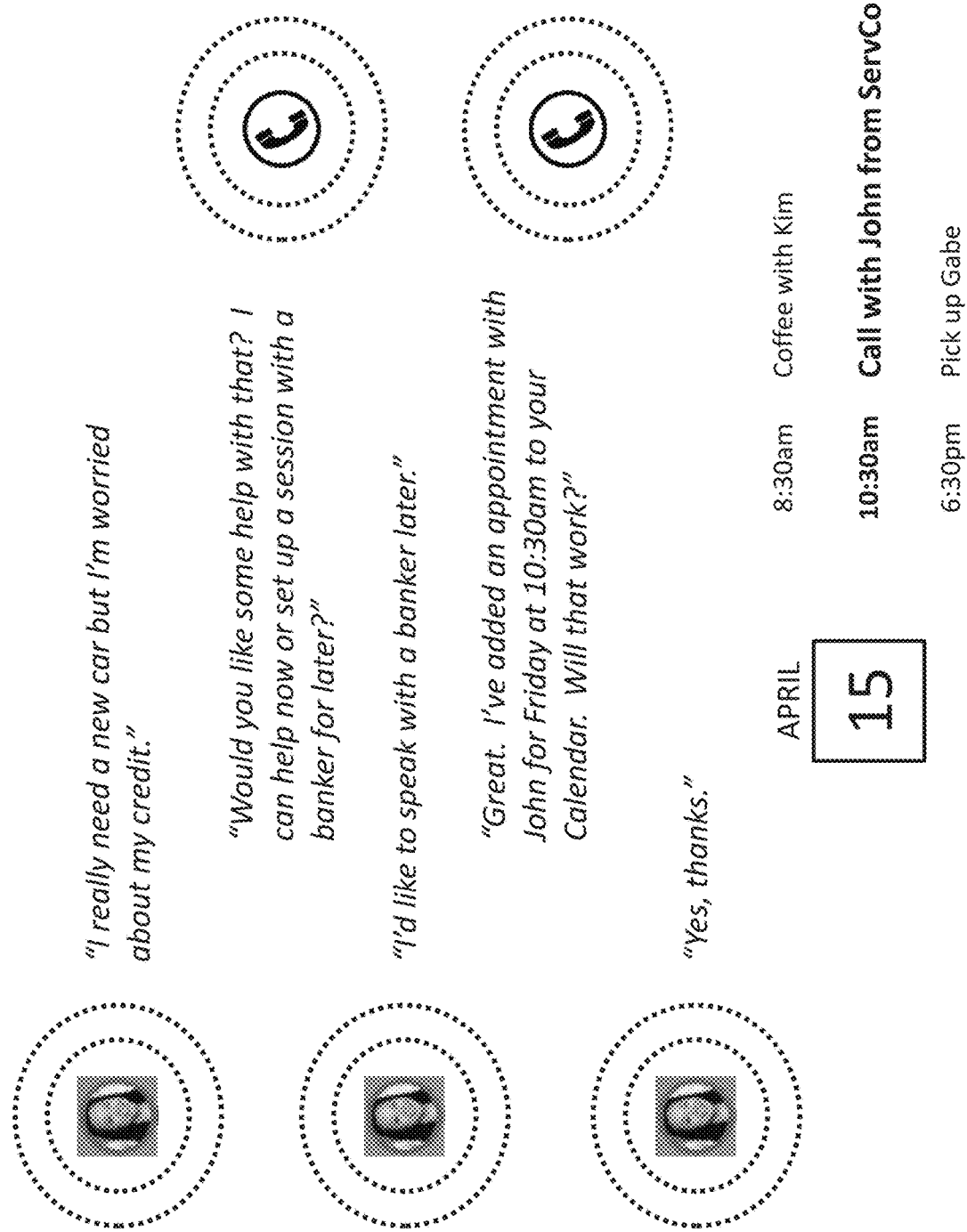
FIG. 9 depicts an example communication between a consumer device and a provider computing device according to example embodiments.

With reference to FIG. 9, which depicts an example communication between a consumer computing device 120 and a provider computing device 110 or an advisor computing device 130, in some examples, a person (e.g., a customer) may have difficulty keeping track of his or her finances and managing his or her credit. The person may be expecting to expand his or her family and wish to get his or her finances under control in order to meet a financial goal of, for example, purchasing a new vehicle in anticipation of expanding the family. In some examples, based on recent transaction history indicating the possibility of a new baby and/or a transaction such as a newly established college fund, the provider computing device 110 may pervasively inquire, via a consumer computing device 120 (e.g., a proactive listing bot), whether the person would like some help with meeting a financial goal. The financial goal may include buying a new car, establishing good credit, etc. The consumer device 120 may listen and interpret the voice input of the person that indicates a desire to meet a financial goal. In some examples, the provider computing device 110 may pervasively inquire, via a consumer computing device 120, whether the person would like to set up a virtual meeting (e.g., a session or an appointment) with one or more bankers or other advisors to discuss the financial goals of the person. In some implementations, the virtual meeting may additionally include one or more family members, members of an authentication circle, etc. After the customer confirms that he or she is interested in a session with an advisor, the provider computing device 110 may generate a command structured to add the virtual meeting to one or more calendars accessible to one or more consumer computing devices 120 associated with the customer (and any others who may be joining the session) and/or a calendar accessible to one or more advisor computing devices 130 of one or more advisors, as shown by the calendar and/or schedule icon ("April 15") in FIG. 9.

In some embodiments, the provider computing device 110 may be part of the computing system of a financial institution. Generally, the financial institution provides financial services (e.g., demand deposit accounts, credit accounts, etc.) to a plurality of customers. The financial institution provides banking services to the customers, for example, so that customers can deposit funds into accounts, withdraw funds from accounts, transfer funds between accounts, view account balances, and the like via one or more provider computing devices 110.

Figure 7:
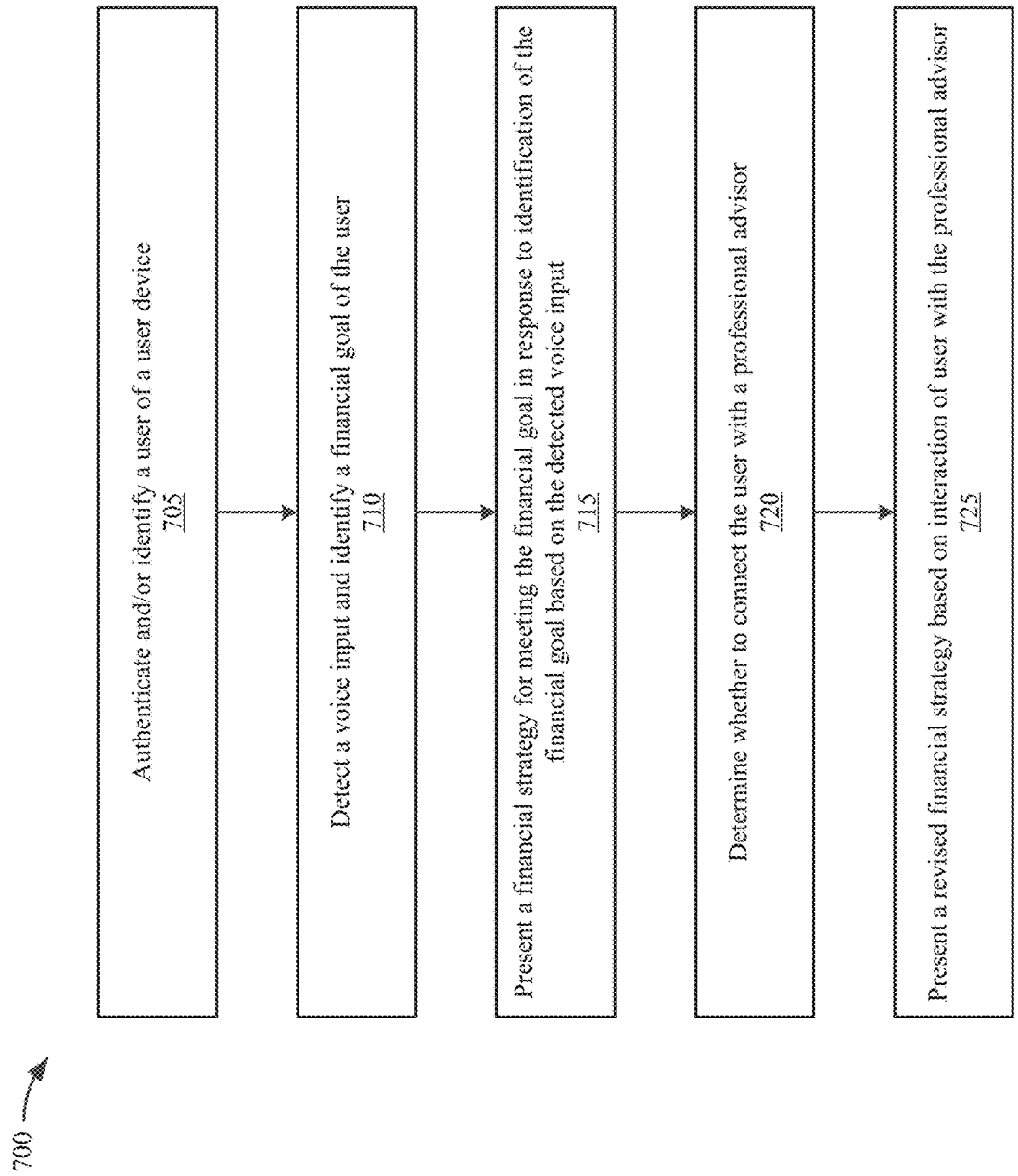
FIG. 7 depicts an example method of advising users according to example embodiments.

Returning to FIG. 7, a flow diagram of a method 700 of providing a proactive listening bot structured to generate an expense strategy is described according to an example embodiment. The expense strategy may include a financial plan, budget, or combination thereof. In some arrangements, the expense strategy may be generated and/or provided in real-time or near real-time. In some arrangements, the expense strategy may include transaction data, account data, etc. from a plurality of accounts of a customer that are spread across multiple financial institutions that may or may not be affiliated with the financial institution.

Prior to the provision or engagement of a proactive listening bot structured to generate an expense strategy, a user may be authenticated to the provider computing device 110 and/or consumer computing device 120 at 705. In some examples, prior to allowing the user to engage with the proactive listening bot, the user may be authenticated as an account holder. The user may be authenticated based on the authentication credentials of that user. In arrangements in which the consumer computing device 120 includes an application 250 associated with the provider computing device 110, the consumer computing device 120 may receive and transmit user authentication data (e.g., data indicative of the identity of a customer/member of the financial institution and/or a user of various systems, applications, and/or products of the financial institution) to, for example, authentication circuitry 230. In such arrangements, the user can be identified and authenticated based on the application of the provider computing device 110 such that the provision of additional identification information or account information by the user is not required. The user authentication data may include any of a password, a PIN (personal identification number), a user ID, an answer to a verification question, a biometric, an identification of a security image, or a combination thereof.

At 710, the provider computing device 110 and/or consumer computing device 120 detects a voice input (e.g., a voice trigger, voice key, etc.) indicative of a financial goal. For example, a user (e.g., a customer, potential customer, other person, etc.) may be contemplating buying a new car. The provider computing device 110 and/or consumer computing device 120 may learn that the user is contemplating buying a new car through active listening to the conversations and/or voice of a user. For example, the user may say "I want to purchase a new car," "I want to save for a home," etc. The provider computing device 110 and/or consumer computing device 120 may be structured to monitor user account information, user financial information, spending patterns, etc. of the user and receive, retrieve, or otherwise access transaction data (e.g., data indicative of a financial goal such as a transaction, an upcoming transaction, purchase, other financial data, etc.) based on the voice input (e.g., the conversation) of the user.

The consumer computing device 120 may provide advice or otherwise make suggestions to the customer. In some arrangements, the consumer computing device 120 may utilize speech recognition and natural language processing to detect the voice input and/or to receive such transaction data. In some arrangements, the consumer computing device 120 may engage in conversation, discussion, or dialogue with the user to learn more about the financial goal and to generate an expense strategy that may be of interest to the user.

In some examples, the consumer computing device 120 may be structured to ask the user questions or otherwise request feedback from the user, such as, "how much do you want to pay for the new car?, how much would you like the monthly loan payment to be?," etc. Responsive to the request, the user may provide a voice input (e.g., the user may answer the question provided by the consumer computing device 120, provide feedback, or otherwise engage in conversation with the consumer computing device 120). In some implementations, the consumer computing device 120 may be structured to receive a voice input from a plurality of users and distinguish the voice input associated with the user from the voice input or sound associated with another person or user. Alternatively or additionally, the provider computing device 110 and/or consumer computing device 120 may learn that the user is contemplating a financial goal (e.g., purchasing a new car) via an advisor computing device 130 of an advisor who may be assisting the user with financial planning, or through other suitable channels.

In some implementations, while the user is engaged in conversation with the consumer computing device 120, the provider computing device 110 and/or consumer computing device 120 may generate an expense strategy structured to meet the financial goal. Alternatively or additionally, the provider computing device 110 and/or consumer computing device 1120 may generate an expense strategy structured to meet the financial goal in response to receiving transaction data. For example, the expense strategy may be generated based on one or more user accounts (e.g., a single account or a plurality of accounts of the user) associated with the financial institution.

At 715, the connected device may be structured to provide an expense strategy structured to meet the financial goal in response to the detection of the voice input. For example, the consumer computing device 110 may output suggestions for meeting the financial goal such as, but not limited to, the creation of a savings goal, a savings plan to meet the financial goal, an investment portfolio, a savings strategy, etc. In the present example, while listening to a conversation of the user, the consumer computing device 120 may detect that the user is interested in the financial goal of purchasing a new car. In response, provider computing device 110 and/or consumer computing device 120 may generate a financial plan, budget, investment strategy, or combination thereof to meet the financial goal of purchasing a new car. The expense strategy may be audibly output from speakers included with or communicatively coupled to the consumer computing device 120. Alternatively or additionally, the expense strategy may be displayed via a mobile application, an in-app message, a social media application, etc.

The provider computing device 110 and/or consumer computing device 120 may include or may be communicatively coupled, via one or more APIs, to a third party computing device 140. The third party computing device 140 may be structured to provide relevant data associated with financial goal of the user. The relevant data may be utilized to generate an expense strategy comprising various options or suggestions determined to meet the financial goal of the user. In this regard, the provider computing device 110 and/or consumer computing device 120 may be communicatively coupled to a third party computing device 140 structured to provide such data as inventory data and costs of, for example, a car.

In some examples, there may be a time period between the receipt of the voice input and the generation of an expense strategy such that transaction data, the voice input, etc. may be stored for later use and/or retrieval. Accordingly, the user may have expressed an interest in the financial goal (e.g., the purchase of a new car, home, property, etc.) minutes, hours, days, or months ago such that the voice input, transaction data, etc. may be stored in, for example, profile 600. Later, the voice input, transaction data, etc., may be retrieved or otherwise accessed by the provider computing device 110 and/or consumer computing device 120 for generation of an expense strategy and/or loan (e.g., an offer to accept a loan) as described herein. For example, the user may have expressed an interest in purchasing a new car several months ago when the desire was not urgent or otherwise was not a priority. When the consumer computing device 120 listens to the conversation of the user and detects that the user is now expecting to have a baby, the voice input, transaction data, etc., may be retrieved or otherwise accessed to generate a recommendation.

In some arrangements, the consumer computing device 120 may be structured to detect the urgency of a financial need. Based on the detection of a voice input indicative of an urgent need financial need (e.g., "We are going to have another child, I need a new car!"), the provider computing device 110 and/or consumer computing device 120 may generate a financial plan, budget, investment strategy, or combination thereof to meet the financial goal (e.g., the goal to purchase a new car) that is more aggressive, time restrictive, etc. than a financial goal associated with a non-urgent need. In some implementations, the urgency of a suspected need may be identified in profile 600 (e.g., as part of one or more urgency or timetable fields of goals and progress 625) based on the voice or words of a customer. Additionally or alternatively, fragmented issue indicators 615 of profile 600 may include a field that characterizes urgency (based on statements indicating urgency, such as "we need a new car this month" or on other contextual information) and/or how much emotion was detected in a statement. The provider computing device 110 and/or consumer computing device 120 may include speech recognition and natural language processing algorithms that detect, calculate, or otherwise determine the speed, tone, aggression, etc., of user speech to detect a voice input indicative of, for example, an urgent financial need. Such indicators may also be provided to advisor computing devices 140 to inform, for example, how sensitive or emotionally-charged a topic might be for the customer being advised.

At 720, the provider computing device 110 and/or consumer computing device 120 may be structured to determine whether to connect the consumer computing device 120 to an advisor computing device 130 based on the expense strategy. In this regard, the consumer computing device 120 may inquire whether the user would like to set up a session or an appointment (e.g., a virtual session, appointment, meeting, etc.) with an advisor (e.g., a banker) to discuss an expense strategy and/or the financial goals of the user. For example, the consumer computing device 120 may ask the user if the user would like some help with obtaining credit for a new car and ask whether the user would like the consumer computing device 120 to connect with an advisor computing device 130 now or set up a session with the advisor computing device 130 for later?

After the user confirms that he or she is interested in a session with an advisor, the consumer computing device 120 may initiate a virtual meeting between the user and an advisor. The consumer computing device 120 and/or advisor computing device 130 may receive and/or retrieve transaction data associated with the user from the provider computing device 110 and/or a third party computing device 130. In turn, the consumer computing device 120 and/or advisor computing device 130 may provide the transaction data via dashboard 310. In various implementations, the virtual meeting may also include others, such as family members, authentication circle members, persons living in the same residence, etc. The consumer computing devices 120 and/or advisor computing device 130 may receive and/or retrieve transaction data associated with multiple users from the provider computing device 110 and/or a third party computing device 130.

Figure 10:
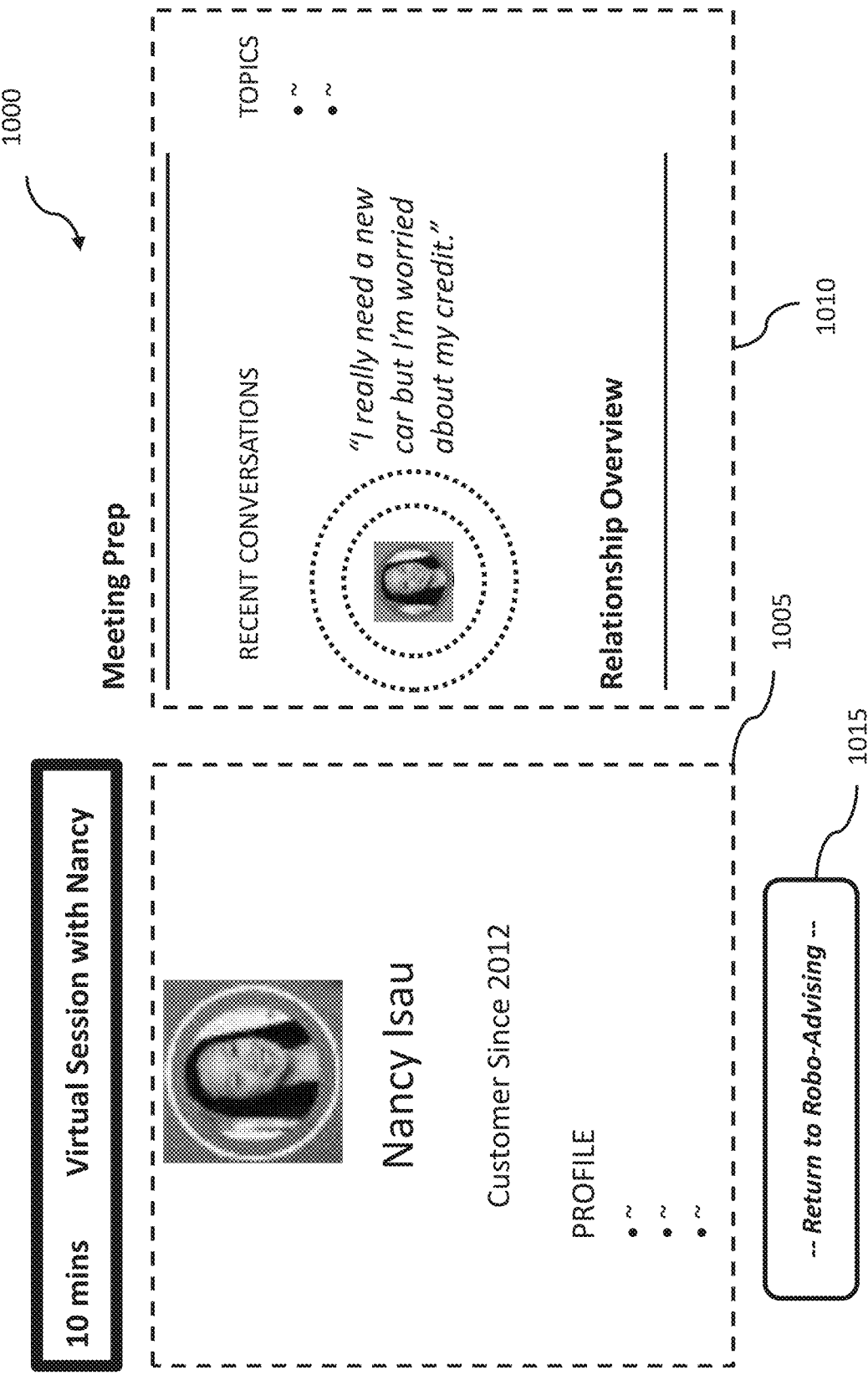
FIG. 10 depicts an example graphical user interface of a potential virtual dashboard according to example embodiments.

FIG. 10 depicts an example graphical user interface of a potential dashboard 310 structured to provide robo or human advising according to example embodiments. The consumer computing device 120 may output, via the graphical user interface, a user profile 1005 associated with the user based on, for example, transaction or account data. The user profile 1005 may identify the user and provide relevant information pertaining to the user (e.g., user name "Nancy Isau," customer status "Customer Since 2012," etc.). In some examples, the graphical user interface may include or otherwise display data and interactions (e.g., conversations, transactions, and/or other relevant data) as represented by icons and/or graphics 1010 that have been compiled by the provider computing device 110 and/or consumer computing device 120 for that user (e.g., the customer's photograph). This may allow a human advisor to seamlessly start the session with the user where the consumer computing device 120 and advisor computing device 130 ended a prior conversation/engagement. The dashboard 310 may also provide a "Return to Robo-Advising" selection 1015 to end the session and return the customer to robo-advising. In some implementations, this selection only becomes available when "back to bot" triggers are detected.

Figure 11:
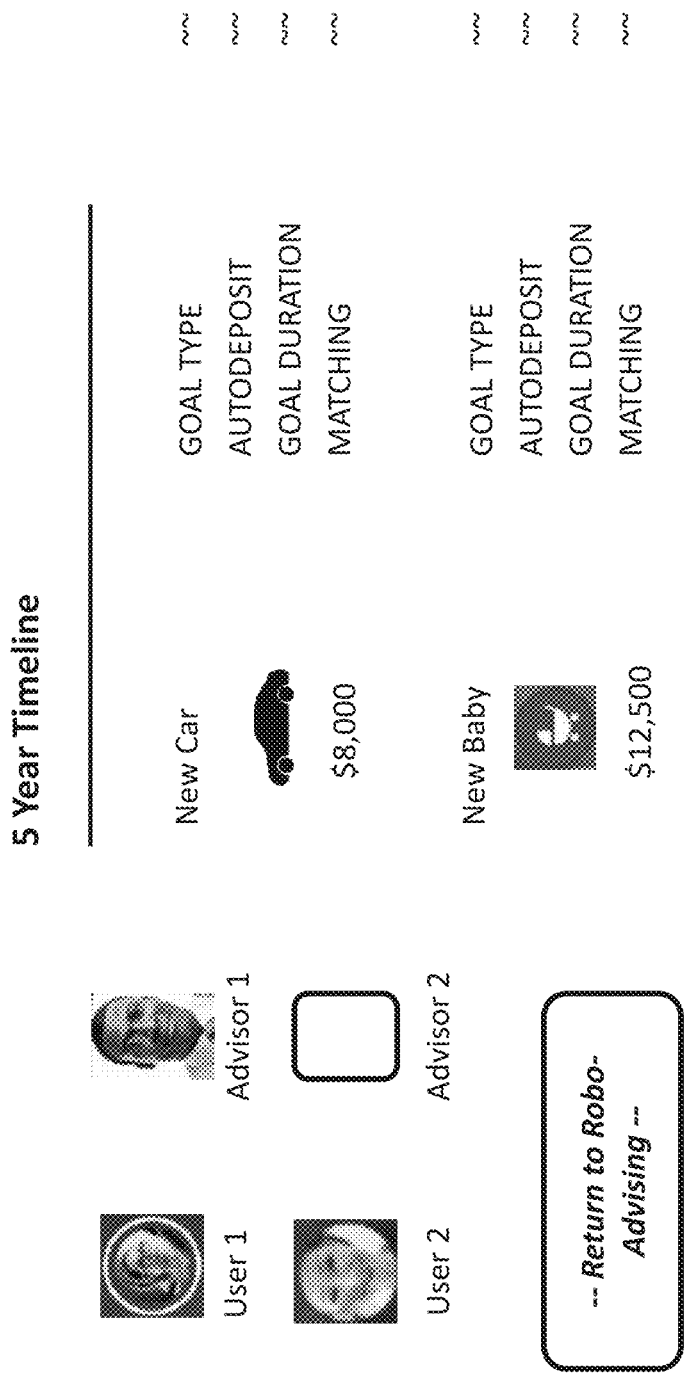
FIG. 11 depicts an example graphical user interface of a potential virtual dashboard according to example embodiments.

FIG. 11 depicts an example graphical user interface of a dashboard 310 according to example embodiments. The provider computing device 110 and/or consumer computing device 120 may be structured to generate an expense strategy according to a time period (e.g., a timeline, one or more minutes, hours, days, years, etc.). During the session (e.g., the virtual robo-advising session with provider computing device 110 or human advising session with advisor computing device 130), the advisor may develop an expense strategy that may be implemented over, for example, a certain period of time based on one or more financial goals. The expense strategy may include one or more icons and graphics structured to represent, for example, a "5 Year Timeline" and/or financial goals of the user. In some arrangements, the graphical user interface may include an image and/or video of an advisor, or audio of the voice of an advisor. The image, video, and/or the audio of the advisor may be provided in real-time or near real-time such that the user may view or otherwise engage with the advisor live. In various implementations, multiple advisees and/or multiple advisors may interact live via dashboard 310. In some implementations, an advisor (e.g., "Advisor 2") may be a robo-advisor helping one or more human advisors (e.g., "Advisor 1") advise or otherwise assist one or more users (e.g., Users 1 and 2).

Figure 12:
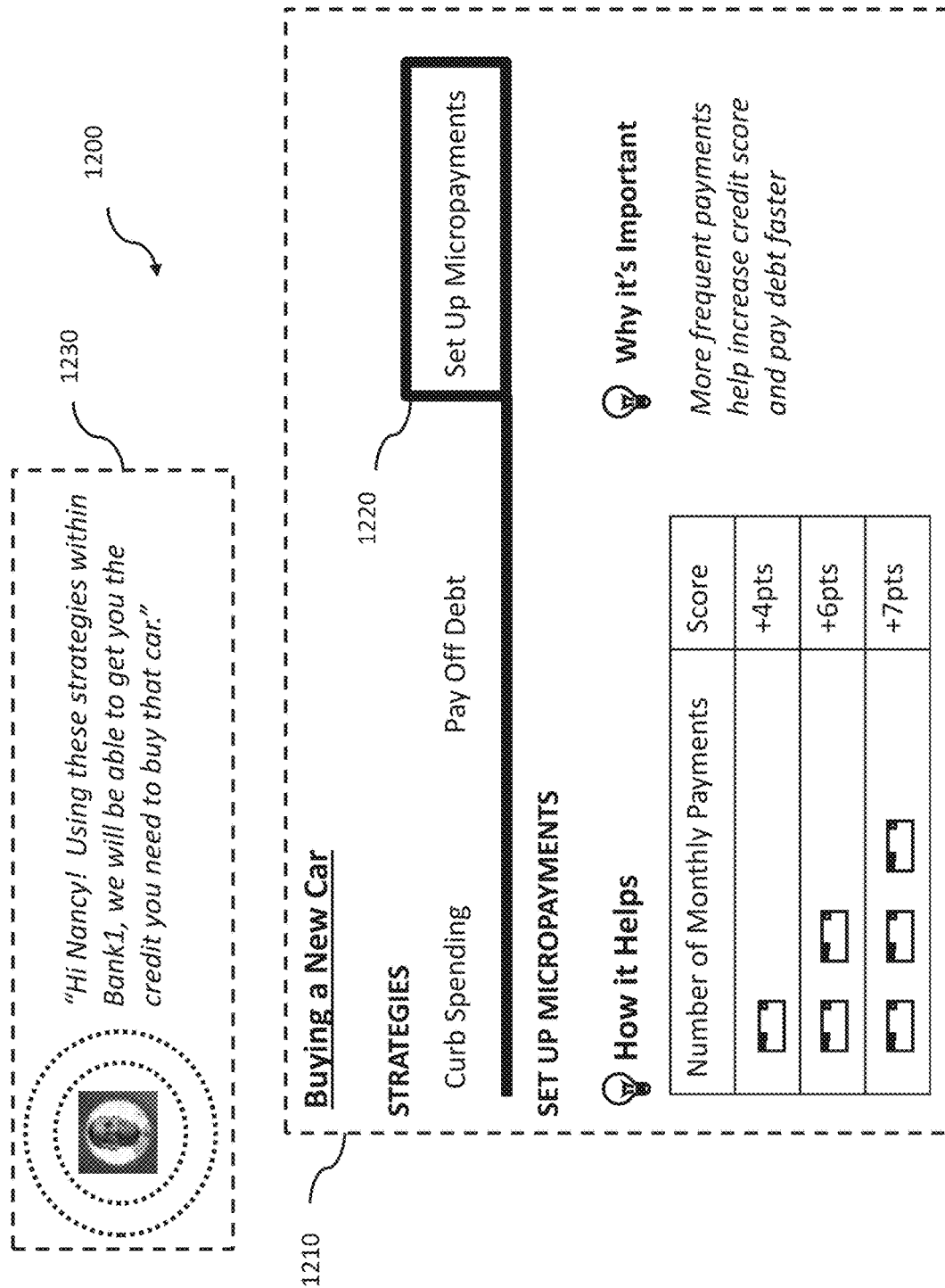
FIG. 12 depicts an example graphical user interface of a potential virtual dashboard according to example embodiments.

FIG. 12 depicts an example graphical user interface 1200 of a potential dashboard 310 according to example embodiments. During or after a session, the robo or human advisor may educate the user on the expense strategy 1210 determined for that user to maintain or otherwise improve progress towards a financial goal (e.g., improve a credit score). As depicted in the graphical user interface 1200 by the icon 1230, the consumer computing device 120 may speak, or output the speech, conversation, voice, etc. of the human (or robo) advisor. For example, the advisor may suggest that the customer make micro-payments on each credit card by setting up auto-pay (weekly, bi-weekly, monthly, etc.) for each credit card to increase the amount of payments that the user makes on time. In turn, the internal credit score of that user may increase more quickly. In some examples, an expense strategy 1210 may be displayed with a proposed change in spending, debt payoff, micropayments, etc. The expense strategy may be represented or further detailed by one or more tabs 1220. The tabs 1220 may be structured to display the expense strategy details dynamically responsive to a user clicking or selecting a tab.

Figure 13:
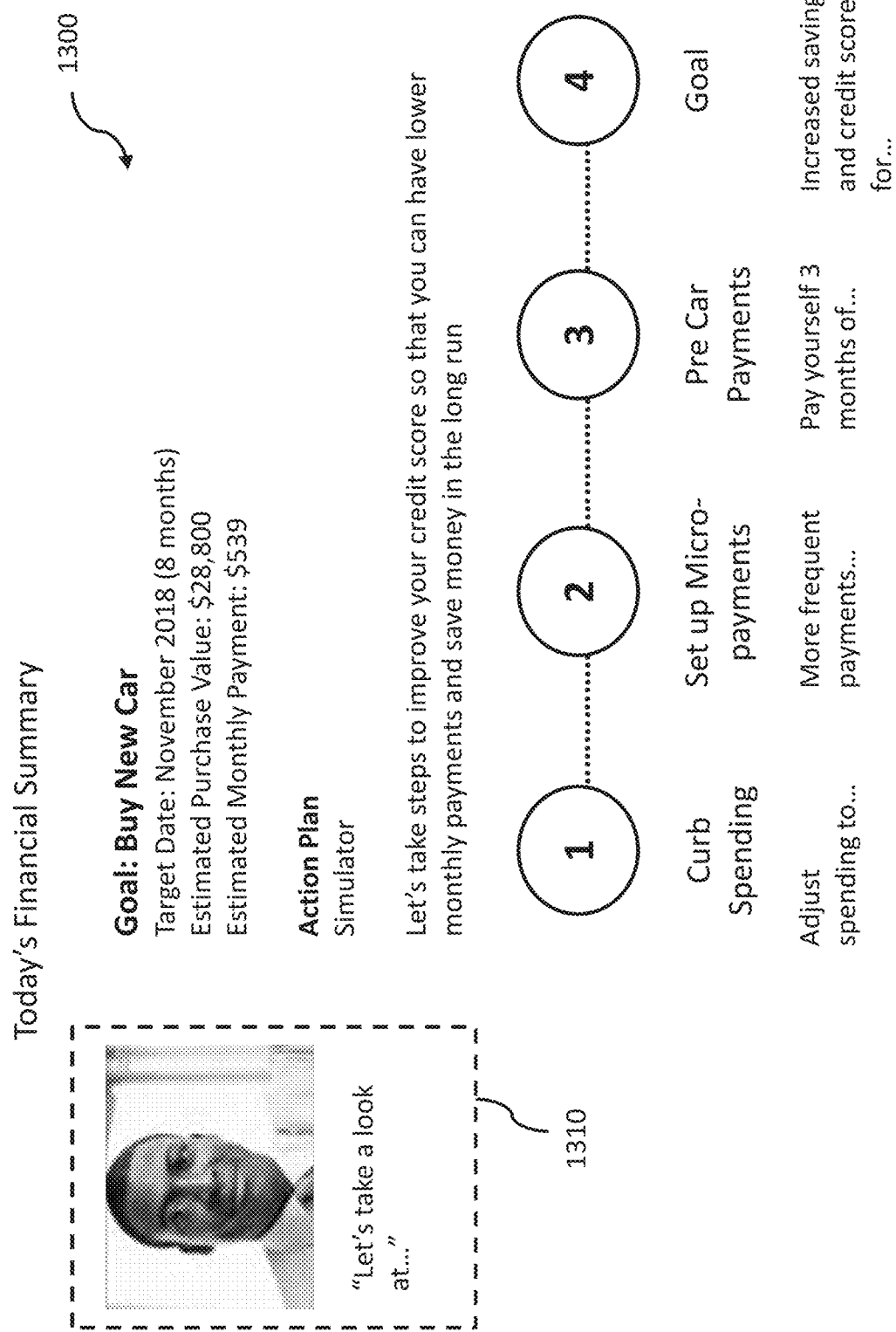
FIG. 13 depicts an example graphical user interface of a potential virtual dashboard accessible according to example embodiments.

FIG. 13 depicts an example graphical user interface 1300 of a potential dashboard 310 according to example embodiments. In some examples, the consumer computing device 120 and/or the advisor computing device 130 may output the graphical user interface 1300. The graphical user interface 1300 may represent a digital dashboard with icons, images, data, charts, other graphics, etc., that may represent a financial goal, action plan, goal progress, etc. In some arrangements, the graphical user interface 1300 may include an image and/or video 1310 representative of an advisor, or audio of the voice of an advisor (and/or a transcription of words spoken by the advisor). The image, video 1310, and/or the audio of the voice of the advisor may be provided in real-time or near real-time such that the user may view or otherwise engage with the advisor live.

Figure 14:
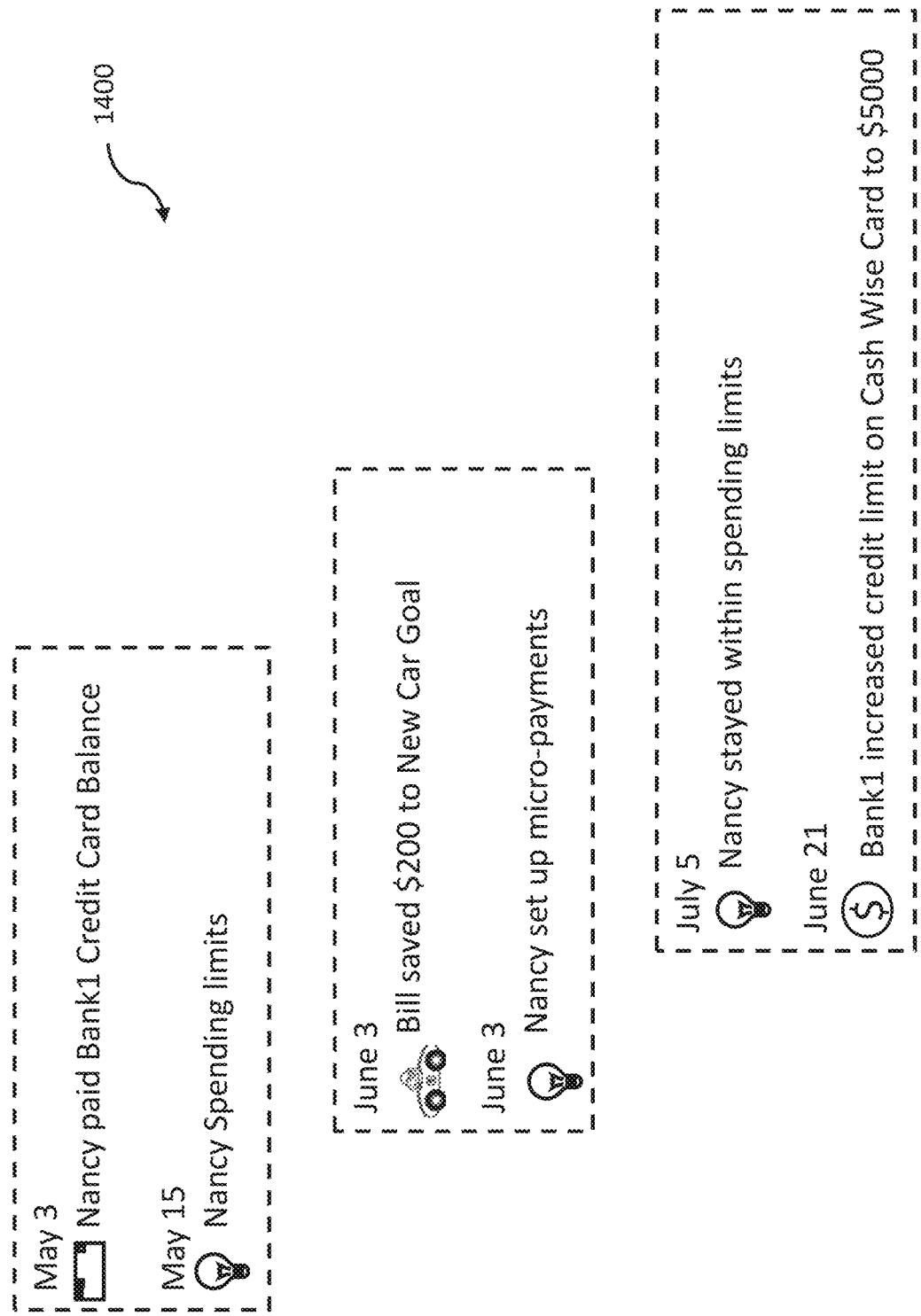
FIG. 14 depicts example notifications for pervasive advising according to example embodiments.

Illustrated in FIG. 14 is an example graphical user interface 1400 of an example dashboard 310 according to example embodiments. In some examples, the dashboard 310 is structured to present an expense strategy notification (e.g., a message, notice, account update, invitation, offer, etc.). In some implementations, the provider computing system 110 may provide, send, or otherwise transmit an expense strategy notification to consumer computing device 120 associated with the customer. The expense strategy notification may be output or otherwise displayed via a user interface 200 (e.g., via a display, speaker, other audio/visual components of the consumer computing device 120). The expense strategy notification may indicate or otherwise inform the user of an action that affects the financial goal of the user as depicted in the graphical user interface 1400. As shown in FIG. 14, the expense strategy notification may output/indicate when the user took an action that affects the expense strategy. For example, the expense strategy notification may include a time stamp, date stamp ("May 3 Nancy paid . . . ," "May 15 Nancy set spending limits," etc.), or other indications of when an action occurred. The expense strategy notification may include a financial goal status based on the action or a plurality of actions taken by the user that affect the expense strategy. In some examples, the provider computing device 110 may transmit an expense strategy notification to the consumer computing device 120 and/or advisor computing device 130 to inform the customer and/or advisor of the amount that the customer can afford to spend or save based on the financial situation of the customer. As shown, the expense strategy notification may include actions from a single user or a plurality of users (e.g., "Bill saved $200 to New Car Goal", "Nancy set up micropayments," etc.). Advantageously, users may find the expense strategy notification as motivational and helpful to improve their financial status and to reach their financial goals (e.g., the goal to purchase a new car).

Figure 15A:
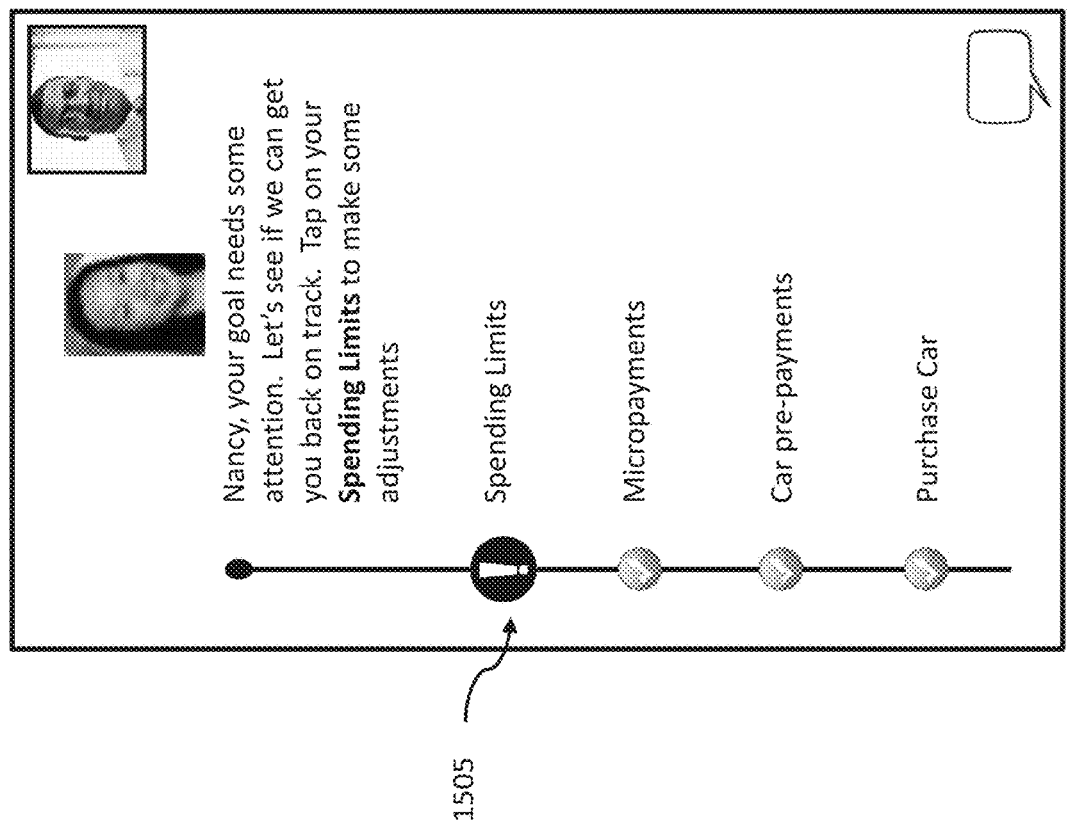
FIG. 15A depicts an example graphical user interface for a possible interaction between a customer and advisor according to example embodiments.

FIG. 15A depicts an example graphical user interface of an example dashboard 310. The illustrated exchange may be between the customer computing device 120 and the advisor computing device 130 (as part of a human advising session), and/or the exchange may be between the consumer computing device 120 and the provider computing device 110 (as part of a robo-advising session). According to an example embodiment, the consumer computing device 120 may present the expense strategy (e.g., advice, suggestions, etc.), which may have been, for example, generated by the provider computing device 110 and/or updated via an advisor computing device 130, to the customer to help the customer review, maintain, or improve progress towards a financial goal. The graphical user interface may be displayed such that the expense strategy may include icons indicative of a goal status (e.g., checkmarks for completed or accomplished, and exclamation points for incomplete or otherwise requiring attention or response). In some implementations, icons presented along a line may indicate an order or timeline for the goals (e.g., one goal may build on or otherwise follow another goal). The icons may correspond to one or more strategies such as, but not limited to, spending limits, micropayments, car pre-payments, car purchase, etc. In some examples, the icons may indicate whether the customer is off track or on track toward reaching the financial goal. For example, one icon indicates that the customer is off-track with maintaining spending limits toward the goal of purchasing a new car. In some examples, the graphical user interface may allow the user to drill down to receive more detail. For example, a customer may click (or otherwise select) icon 1505 and/or provide a voice command to see more information about how the customer may get back on track toward meeting the financial goal.

Figure 15B:
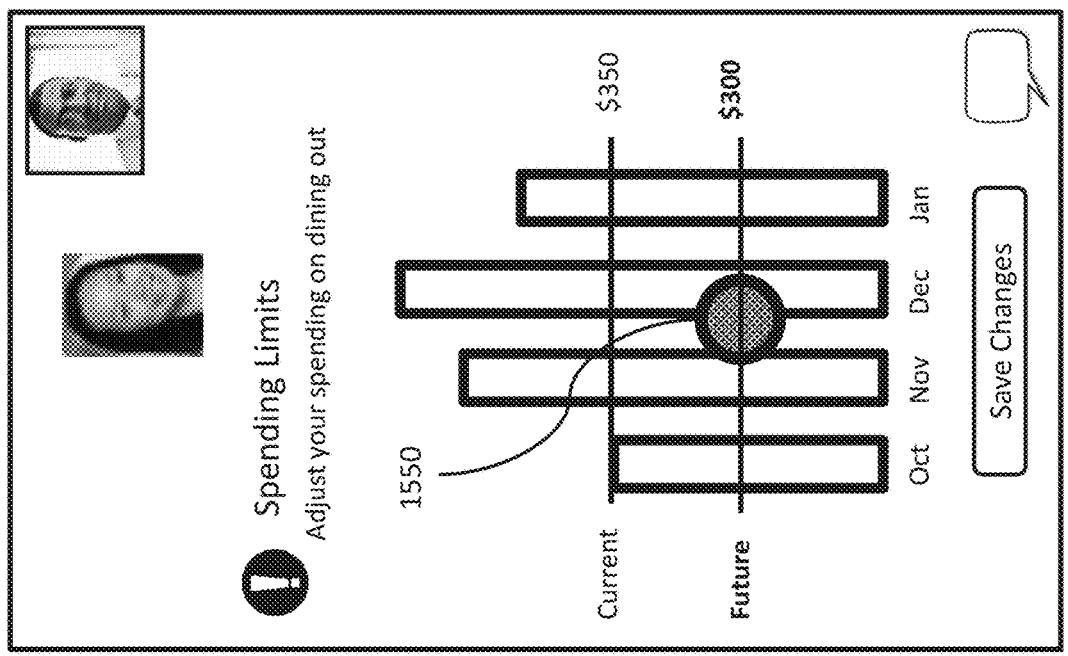
FIG. 15B depicts an example graphical user interface for a possible interaction between a customer and advisor according to example embodiments.

In some examples, if a customer selects one of the identified goals in FIG. 15A, another graphical user interface, such as the one depicted in FIG. 15B, may be presented. The graphical user interface may include icons/graphics that represent, for example, the spending limits of a customer. The graphical user interface may include an adjuster icon 1550 (e.g., a graphical dial, slider control, etc.) structured to allow the customer (or advisor) to adjust/control, via dashboard 310, various values (such as spending limits) as desired by the user. For example, the icon 1550 may be adjusted up, down, left, right, or in any other direction/position via the customer computing device 120 and/or advisor computing device 130. In some examples, the icon 1550 may represent a spending limit that is adjustable via the provider computing device 110 (as part of robo-advising) or the advisor computing device 130 (as part of human advising). Responsive to the adjustment of the icon 1550, the spending limits of the user may then represent whether the user is off-track or on-track toward reaching the financial goal. The provider computing device 110, consumer computing device 120, and/or advisor computing device 130 may update profile 600 (e.g., by entering, updating, or revising values in fields corresponding to the goals and progress 625 parameter). In some arrangements, the graphical user interface may include an image and/or video representative of an advisor (e.g., at the top right in FIG. 15A) and/or audio of the voice of an advisor in real-time or near real-time such that the user may view or otherwise engage with the advisor live. The graphical user interface may include a selection (e.g., the virtual "Save Changes" button) to allow the customer or advisor to save adjustments to the expense strategy, spending limits, etc.

Figure 15C:
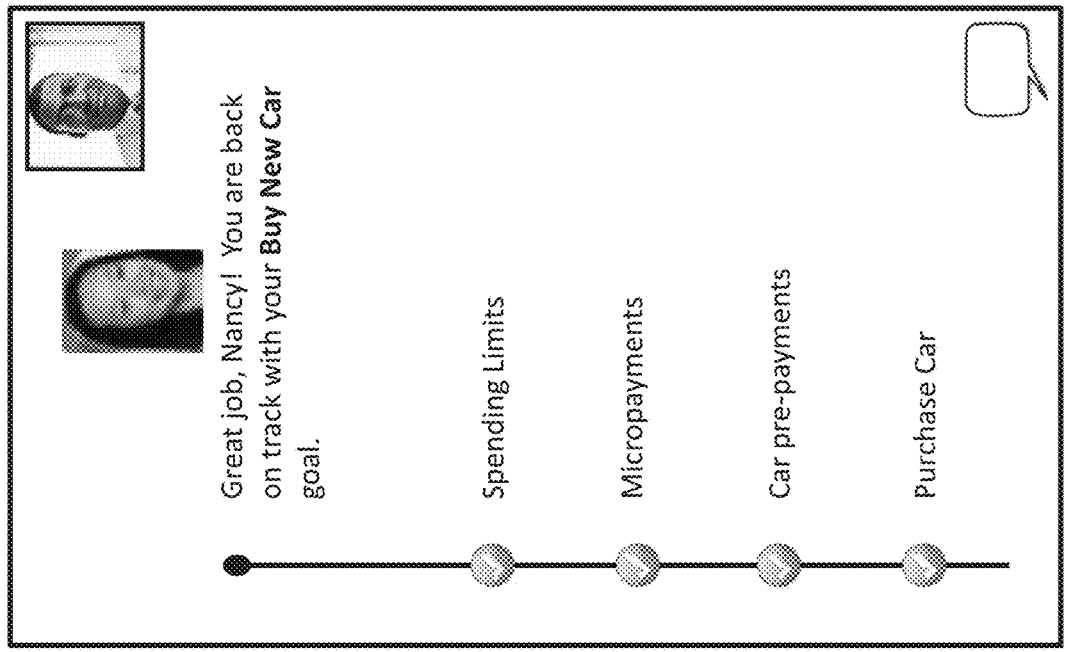
FIG. 15C depicts an example graphical user interface for a possible interaction between a customer and advisor according to example embodiments.

FIG. 15C depicts an example graphical user interface of an potential dashboard 310 according to example embodiments. In various implementations, the provider computing device 110 may present the graphical user interface depicted in FIG. 15C to the customer via the consumer computing device 120 and/or to the advisor via advisor computing device 130. In some examples, the graphical user interface may be presented to the user in response to the user clicking an icon or button and/or providing a voice command as described herein. The graphical user interface may include a notification, message, and/or update that includes the current status of the user toward meeting a financial goal. As depicted in FIG. 15C, the checkmark icon (formerly an exclamation point) adjacent to "Spending Limits" may indicate the customer is back on track based on, for example, the limits, transactions, adjustments made (via, e.g., the graphical user interface of FIG. 15B), or other actions of the customer.

Figure 16:
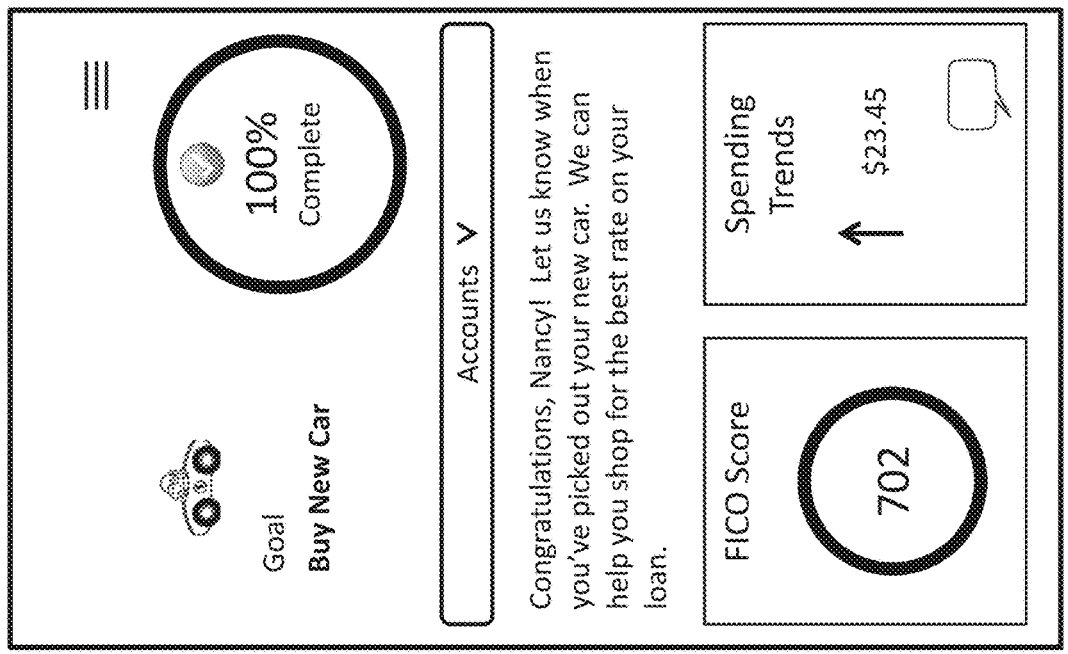
FIG. 16 depicts an example graphical user interface for a potential virtual dashboard accessible customers and/or advisors according to example embodiments.

FIG. 16 depicts an example graphical user interface of an potential dashboard 310. According to an example embodiment, the provider computing device 110 may present the graphical user interface to the customer and/or advisor via the consumer computing device 120 and/or the advisor computing device 130. In some examples, the graphical user interface may represent a digital dashboard that includes icons, images, data, charts (e.g., the graphical charts/graphs), other graphics, etc., that may represent the credit score, spending trends, status of the customer toward reaching the financial goal, etc. According to the current example depicted in FIG. 16, the customer has made 100% progress toward the financial goal of buying a new car. The content of the digital dashboard may be provided in real-time or near real-time by the provider computing device 110. Advantageously, the customer may be informed of the current status of reaching the financial goal based on the real-time or near real-time update of the digital dashboard.

Figure 17:
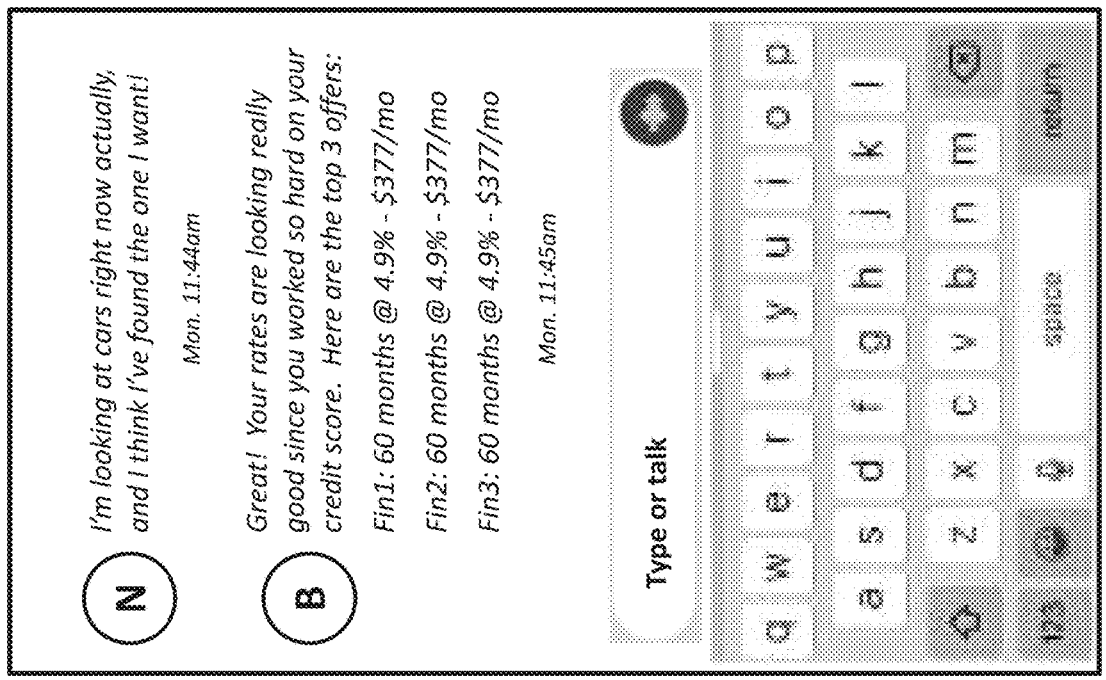
FIG. 17 depicts an example graphical user interface for an interaction between a customer and advisor according to example embodiments.

FIG. 17 is an example graphical user interface of a potential dashboard 310 according to an example embodiment. In some examples, the provider computing device 110 is structured to generate an expense strategy notification (e.g., a message, SMS, notice, account update, invitation, offer, etc.). The provider computing device 110 may provide, send, or otherwise transmit the expense strategy notification to a consumer computing device 120 and/or advisor computing device 130. The expense strategy notification may be output or otherwise presented via a display, speaker, other audio/visual components of the consumer computing device 120 and/or the advisor computing device 130. For example, the expense strategy notification may include an offer for an auto loan transmitted to the consumer computing device 120 of the customer when the customer meets the financial goal as identified by the provider computing device 110 and/or advisor computing device 130. In some implementations, an expense strategy notification that includes an offer may be transmitted to the consumer computing device 120 in response to the consumer computing device 120 transmitting an expense strategy notification (e.g., a SMS that includes information that the customer is ready to buy the car, a home, etc.) to the provider computing device 110 and/or the advisor computing device 130.

As used herein, the term "authentication circle" may refer to a group comprising two or more members who are connected or otherwise linked such that a first member of the authentication circle may gain access to an account of a second member of the authentication circle without providing authentication credentials of the second member of the authentication circle. For example, the first member may be authenticated to access the account of the second member by providing authentication credentials of the first member, instead of providing authentication credentials of the second member. An authentication circle may be formed among members who are family, friends, or otherwise related. Members of an authentication circle may share a goal (financial or otherwise), and one or more members may wish to monitor and/or manage the accounts (financial or otherwise) of one or more other members.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

The various components of the computing systems and user devices (such as modules, monitors, engines, trackers, locators, circuitry, interfaces, sensors, etc.) may be implemented using any combination of hardware and software structured to execute the functions described herein. In some embodiments, each respective component may include machine-readable media for configuring the hardware to execute the functions described herein. The component may be embodied at least in part as one or more circuitry components including, but not limited to, processing circuitry, network interfaces, peripheral devices, input devices, output devices, sensors, etc. In some embodiments, a component may take the form of one or more analog circuits, electronic circuits (e.g., integrated circuits (IC), discrete circuits, system on a chip (SOCs) circuits, etc.), telecommunication circuits, hybrid circuits, and any other type of circuit. In this regard, the component may include any type of element for accomplishing or facilitating achievement of the operations described herein. For example, a component as described herein may include one or more transistors, logic gates (e.g., NAND, AND, NOR, OR, XOR, NOT, XNOR, etc.), resistors, multiplexers, registers, capacitors, inductors, diodes, wiring, and so on).

The component may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given components or parts thereof may be disposed locally (e.g., as part of a local server, a local computing system, etc.) or remotely (e.g., as part of a remote server such as a cloud based server). To that end, a component as described herein may include elements that are distributed across one or more locations.

An example system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method comprising:
    detecting a first sound sample using a sound sensor of a first device, the sound sensor being configured to capture ambient sounds;
    analyzing the first sound sample to detect a first voice input based at least in part on a biometric voice signature of a user;
    detecting an advising trigger based at least in part on the first voice input;
    initiating one or more advising sessions based on the advising trigger, wherein initiating the one or more advising sessions comprises at least one of:
        (1) initiating a robo-advising session and receiving one or more inputs via the first device; or
        (2) initiating a human advising session by initiating a live communication session between the first device and a second device of a human advisor and receiving the one or more inputs via the first device.

2. The method of claim 1, further comprising perceptibly presenting a virtual dashboard with graphical elements to facilitate at least one of the one or more advising sessions.

3. The method of claim 2, wherein the virtual dashboard facilitates the human advising session between the first and second devices.

4. The method of claim 3, wherein detecting the advising trigger comprises detecting a goal, the method further comprising:
    detecting an urgency of the goal based on at least one of speed, tone, or aggression of user speech;
    formulating, based at least in part on the urgency of the goal, an action item for achieving the goal; and
    presenting the action item via one or more user interfaces of the first device.

5. The method of claim 1, wherein detecting the advising trigger further comprises detecting, using a location sensor of the first device, a physical location of the first device, and associating the physical location with a goal.

6. The method of claim 1, wherein initiating the one or more advising sessions comprises initiating the robo-advising session, and wherein the robo-advising session comprises:
    detecting a goal based at least on the first voice input;

formulating, based at least in part on a user profile corresponding to the user, an action item for achieving the goal; and presenting the action item via one or more user interfaces of the first device.

7. The method of claim 1, wherein initiating the one or more advising sessions comprises: (1) initiating the robo-advising session, (2) terminating the robo-advising session, and (3) initiating the human advising session.

8. The method of claim 7 wherein the robo-advising session further comprises detecting a human advising transition trigger in the one or more inputs, and wherein the human advising session is initiated in response to detection of the human advising transition trigger.

9. The method of claim 7, wherein the robo-advising session is a first robo-advising session, wherein the human advising session further comprises detecting a robo-advising transition trigger during the live communication session, and wherein the method further comprises terminating the human advising session and initiating a second robo-advising session in response to detection of the robo-advising transition trigger.

10. The method of claim 1, wherein initiating the one or more advising sessions comprises: (1) initiating the human advising session, (2) terminating the human-advising session, and (3) initiating the robo-advising session.

11. The method of claim 10, wherein the human advising session further comprises detecting a robo-advising transition trigger during the live communication session, and wherein the robo-advising is initiated in response to detection of the robo-advising transition trigger.

12. The method of claim 1, wherein initiating the one or more advising sessions comprises initiating the robo-advising session, and wherein the robo-advising session further comprises formulating, based on the one or more inputs and on a user profile corresponding to the user, an action item for achieving a goal, and perceptibly presenting the action item via one or more user interfaces of the first device.

13. The method of claim 12, wherein:
(A) the action item is a first action item;
(B) receiving the one or more inputs via the first device comprises:
  (1) detecting a second sound sample using the sound sensor following presentation of the first action item; and
  (2) analyzing the second sound sample to detect a second voice input; and
(C) the robo-advising session further comprises:
  (1) formulating, based on the second voice input and on the user profile, a second action item; and
  (2) perceptibly presenting the second action item via one or more user interfaces of the first device.

14. The method of claim 1, wherein the advising trigger is a spoken request for advising.

15. A service provider computing system comprising:
a database with a user profile corresponding to a user; and
a network interface configured to communicatively couple the service provider computing system to:
  a first device having a sound sensor for detecting ambient sounds and a first set of one or more user interfaces for perceptibly presenting information to the user and receiving user inputs; and
  a second device having a second set of one or more user interfaces for perceptibly presenting information to an advisor and receiving advisor inputs;

wherein at least one of the first device and the service provider computing system is configured to:
  detect a first sound sample using the sound sensor of the first device, the sound sensor being configured to capture ambient sounds;
  analyze the first sound sample to detect a first voice input based at least in part on a biometric voice signature of a user;
  detect an advising trigger based at least in part on the first voice input;
  initiate a human advising session comprising:
    initiating a live communication session between the first device and the second device, wherein a virtual dashboard with graphical elements facilitates the human advising session between the first and second devices.

16. The system of claim 15, wherein the service provider computing system is configured to perceptibly present the virtual dashboard, wherein the virtual dashboard is configured to present a subset of the user profile.

17. The system of claim 15, further comprising initiating a robo-advising session comprising:
detecting a goal based at least on the first voice input;
formulating, based at least in part on a user profile corresponding to the user, an action item for achieving the goal; and
presenting the action item via one or more user interfaces of the first device.

18. A computing device comprising:
a set of one or more user interfaces for perceptibly presenting information to a user and receiving user inputs, the set of user interfaces comprising a sound sensor for detecting ambient sounds;
a processor configured to:
  detect a first sound sample using the sound sensor;
  analyze the first sound sample to detect a first voice input comprising an advising trigger based at least in part on the first voice input; and
  initiate a robo-advising session using the one or more user interfaces, the robo-advising session comprising detecting a second voice input via the sound sensor, and presenting, based on the second voice input, one or more action items for achieving a goal.

19. The device of claim 18, further comprising a network interface configured to communicatively couple the computing device to a second computing device having a second set of one or more user interfaces for perceptibly presenting information to an advisor and receiving advisor inputs, wherein the processor is further configured to initiate a human advising session comprising:
initiating a live communication session between the first device and the second device; and
perceptibly presenting a virtual dashboard with graphical elements configured to facilitate the human advising session between the first and second devices.

20. The device of claim 19, wherein the robo-advising session comprises detecting a human advising transition trigger, and wherein the instructions further cause the processor to, in response to detecting the human-advising transition trigger, terminate the robo-advising session and initiate the live communication session between the first device and the second device.

* * * * *